United States Patent
Evans et al.

(10) Patent No.: US 12,488,569 B2
(45) Date of Patent: Dec. 2, 2025

(54) UNPAIRED IMAGE-TO-IMAGE TRANSLATION USING A GENERATIVE ADVERSARIAL NETWORK (GAN)

(71) Applicant: The Boeing Company, Chicago, IL (US)

(72) Inventors: Nick Shadbeh Evans, Lynnwood, WA (US); Jasper Patrick Corleis, Renton, WA (US); Amir Afrasiabi, University Place, WA (US)

(73) Assignee: The Boeing Company, Arlington, VA (US)

( * ) Notice: Subject to any disclaimer, the term of this patent is extended or adjusted under 35 U.S.C. 154(b) by 571 days.

(21) Appl. No.: 17/540,198

(22) Filed: Dec. 1, 2021

(65) Prior Publication Data

US 2022/0189145 A1   Jun. 16, 2022

Related U.S. Application Data

(60) Provisional application No. 63/125,350, filed on Dec. 14, 2020.

(51) Int. Cl.
*G06V 10/774*     (2022.01)
*G06F 18/21*      (2023.01)
(Continued)

(52) U.S. Cl.
CPC .......... *G06V 10/774* (2022.01); *G06V 10/776* (2022.01); *G06V 10/82* (2022.01);
(Continued)

(58) Field of Classification Search
CPC ... G06F 18/214; G06F 18/217; G06V 10/774; G06V 10/776; G06V 10/82; G06V 20/17; G06V 20/56; G06V 20/70; G06N 3/045; G06N 3/0475; G06N 3/094; G06T 5/60; G06T 2207/20084; G06T 2207/30252; G06T 2211/428; G06T 2211/441
See application file for complete search history.

(56) References Cited

U.S. PATENT DOCUMENTS

| | | | |
|---|---|---|---|
| 10,235,601 B1* | 3/2019 | Wrenninge | G06F 18/214 |
| 2019/0295223 A1* | 9/2019 | Shen | G06T 5/60 |

(Continued)

OTHER PUBLICATIONS

Wang et al., "OccGAN: Semantic image augmentation for driving scenes", Jun. 2020, Elsevier, Pattern Recognition Letters 136, p. 257-263. (Year: 2020).*

(Continued)

*Primary Examiner* — Vincent Rudolph
*Assistant Examiner* — Timothy Choi
(74) *Attorney, Agent, or Firm* — Harrity & Harrity, LLP

(57) ABSTRACT

An apparatus for identifying objects receives a dataset comprising an image having first real image features; trains a neural network to recognize the first real image features in the received dataset; and performs a synthetic image augmentation to generate synthetic image features corresponding to the first real image features in the received dataset using the neural network. The synthetic image augmentation allows for improved training of a computer vision function for recognizing second real image features, corresponding to the synthetic image features, in a real-world environment.

20 Claims, 13 Drawing Sheets

(51) Int. Cl.
    *G06F 18/214*     (2023.01)
    *G06N 3/045*     (2023.01)
    *G06N 3/0475*     (2023.01)
    *G06N 3/094*     (2023.01)
    *G06T 5/60*     (2024.01)
    *G06V 10/776*     (2022.01)
    *G06V 10/82*     (2022.01)
    *G06V 20/17*     (2022.01)
    *G06V 20/70*     (2022.01)

(52) U.S. Cl.
    CPC .............. *G06V 20/17* (2022.01); *G06V 20/70* (2022.01); *G06F 18/214* (2023.01); *G06F 18/217* (2023.01); *G06N 3/045* (2023.01); *G06N 3/0475* (2023.01); *G06N 3/094* (2023.01); *G06T 5/60* (2024.01); *G06T 2207/20084* (2013.01)

(56) References Cited

U.S. PATENT DOCUMENTS

2020/0342652 A1* 10/2020 Rowell .................. G06V 10/82
2021/0141986 A1* 5/2021 Ganille .................. G06Q 10/04

OTHER PUBLICATIONS

Tremblay et al., "Training Deep Networks with Synthetic Data: Bridging the Reality Gap by Domain Randomization", Jun. 2018, IEEE, 2018 IEEE/CVF Conference on Computer Vision and Pattern Recognition Workshops (CVPRW), p. 1082-1090. (Year: 2018).*

Zhu et al., "Unpaired Image-to-Image Translation using Cycle-Consistent Adversarial Networks", Oct. 2017, IEEE, 2017 IEEE International Conference on Computer Vision (ICCV), p. 2242-2251. (Year: 2017).*

Le et al., "Machine Learning with Synthetic Data—a New Way to Learn and Classify the Pictorial Augmented Reality Markers in Real-Time", Nov. 2020, IEEE, 2020 35th International Conference on Image and Vision Computing New Zealand (IVCNZ), p. 1-6. (Year: 2020).*

Yun et al., "Improved visible to IR image transformation using synthetic data augmentation with cycle-consistent adversarial networks", May 2019, SPIE, Proceedings vol. 10995, Pattern Recognition and Tracking XXX, p. 1099502-1099502-8. (Year: 2019).*

* cited by examiner

UNPAIRED IMAGE-TO-IMAGE TRANSLATION USING A GENERATIVE ADVERSARIAL NETWORK (GAN)

CROSS-REFERENCE TO RELATED APPLICATION

This application claims the benefit of and priority to U.S. Provisional Application No. 63/125,350, entitled "Unpaired Image-to-Image Translation Using a Generative Adversarial Network (GAN)", filed Dec. 14, 2020, which is incorporated by reference herein in its entirety.

BACKGROUND

Autonomous vehicles, including for different applications and in different environments, require situational awareness, object detection, and classification to operate safely. The situational awareness capabilities must be trustworthy and robust for the autonomous vehicle to perform properly and effectively. In many instances, machine learning is used to train autonomous vehicles.

However, in order to satisfactorily perform machine learning for autonomous vehicles, enormous amounts of data, e.g., up to hundreds of millions of images or more, often must be learned. Although field collected data can enable creation thousands of images, before data from the images can be learned, the data must be labeled. Data labeling is a time consuming and often manual process, which can involve the addition of semantic segmentation and/or state information to every single image. For example, semantic segmentation involves drawing a polygon mask around specific features in each image, and classifying the object. While this process of collecting data is feasible for large fleets of land vehicles, it is impossible with a single vehicle or small aircraft fleet. Moreover, this conventional process can be prone to errors.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

In one implementation, an apparatus for identifying objects includes a processor and a memory. The processor is configured to execute instructions stored on the memory. The memory stores computer-readable instructions that, when executed by the processor, cause the processor to receive a dataset comprising an image having first real image features; train a neural network to recognize the first real image features in the received dataset; and perform a synthetic image augmentation to generate synthetic image features corresponding to the first real image features in the received dataset using the neural network, such that the synthetic image augmentation allows for improved training of a computer vision function for recognizing second real image features, corresponding to the synthetic image features, in a real-world environment.

In another implementation, a method for identifying objects includes receiving a dataset comprising an image having first real image features; training a neural network to recognize the first real image features in the received dataset; and performing a synthetic image augmentation to generate synthetic image features corresponding to the first real image features in the received dataset using the neural network, such that the synthetic image augmentation allows for improved training of a computer vision function for recognizing second real image features, corresponding to the synthetic image features, in a real-world environment.

In yet another implementation, a computer program product, comprising a computer usable medium having a computer readable program code embodied therein, the computer readable program code adapted to be executed, to identify objects, to receive a dataset comprising an image having first real image features; train a neural network to recognize the first real image features in the received dataset; and perform a synthetic image augmentation to generate synthetic image features corresponding to the first real image features in the received dataset using the neural network, such that the synthetic image augmentation allows for improved training of a computer vision function for recognizing second real image features, corresponding to the synthetic image features, in a real-world environment.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts:

Corresponding reference characters indicate corresponding parts throughout the drawings. In FIGS. 1 to 12, the systems are illustrated as schematic drawings. The drawings may not be to scale.

DETAILED DESCRIPTION

Figure 1:
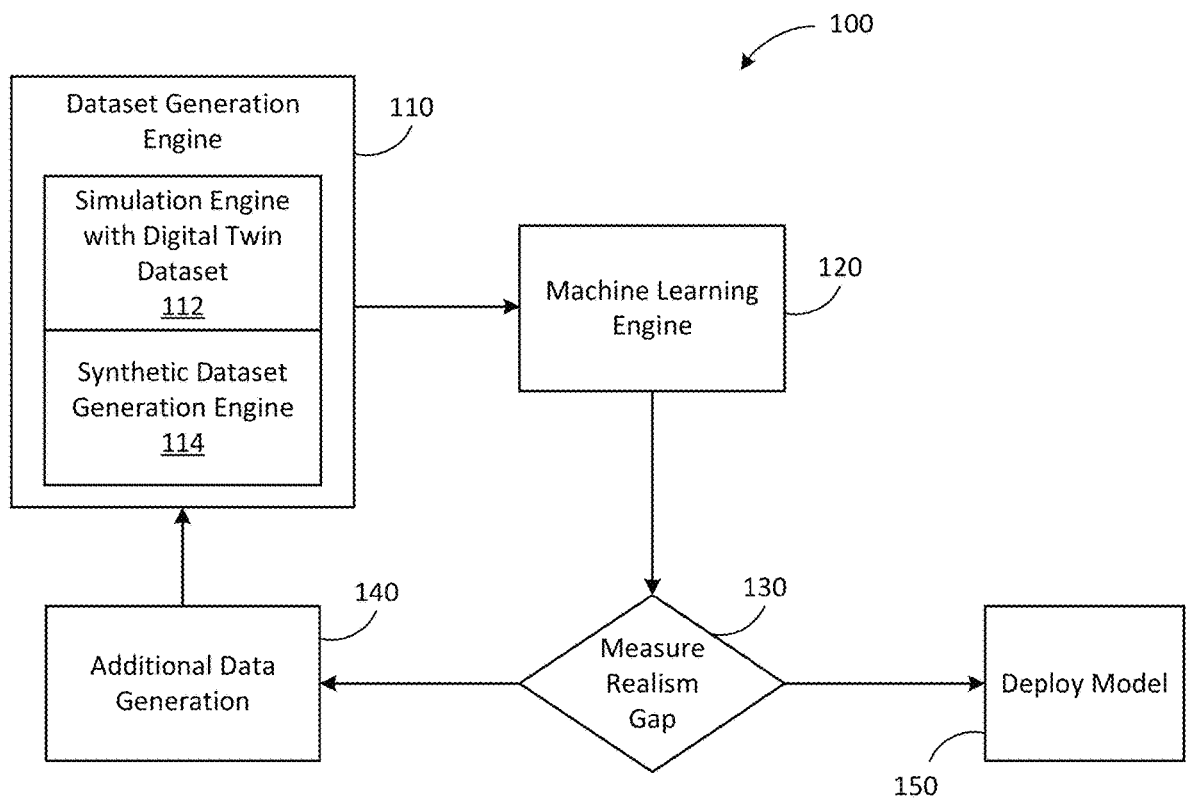
FIG. 1 illustrates a method of autonomous vehicle training according to various implementations of the present disclosure.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Real image data sets are limited in quantity and expensive. Simulation is known but limited in realism and/or fidelity. Accordingly, implementations of the present disclosure add features to real data or add realistic components to simulated data and use artificial intelligence (AI) to identify gaps and fill in those gaps with real or simulated data. For example, various implementations of the present disclosure relate to unpaired image-to-image translation using a machine learning framework such as a neural network (e.g., a generative adversarial network (GAN)), although other approaches are contemplated. For example, various implementations perform unpaired image-to-image translation using GAN for different airport environment data generation. A GAN model is trained for unpaired image to image translation using one or both of (i) collected datasets of red, green, blue (RGB) images in a limited number of airport environments, and (ii) digital twin datasets that include both real and synthetic data. The data generated by the GAN includes different image augmentations such as environment images from a single frame or series of frames in a temporal format of RGB images or a single frame or series of frames in a temporal format of RGB images from different image augmentations such as environment images. These implementations address the lack of scale and diversity in real data for training autonomous vehicle's artificial intelligence (AI) models. Alternatively, some implementations augment simulated data with real data.

For example, the training data represents various angles and amounts of lens flare and/or lighting, different perspectives of objects including different angles and differences, different backgrounds in which an object is placed, different weather conditions such as rain, fog, smoke, hail, and snow, and occlusions in the image such as water droplets, lens damage, dust particulates, other objects in the way, and bug splat on the lens, among others.

Various implementations use GAN augmentation to enable a limitless variety of image augmentations to be provided by leveraging any real or simulation data as a base. Possible augmentations include, for example, sensor imperfections, such as lens flare, dust, rain droplets, snow, bug splats, lens cracks, blurriness, sensor noise, and intrinsic sensor imperfections. Possible augmentations further include environmental features, such as volumetric weather, ground cover/vegetation/snow, wet appearance, time of day light, shadows, cracks, oil slicks, foreign object debris (FOD), skid marks, and additional object rendering. Utilizing simulation generated images enables thousands of pre-labeled images to be generated in minutes as opposed to taking hundreds of hours for field data collection and thousands of hours to label the data afterwards.

Simulation generated images further enable accurate segmentation. Due to full control of the simulation, pixel level accuracy is automatically generated for semantic segmentation masks by changing model representation modes, such as semantic, synthetic, etc. Controllable simulation variables can be used that include (i) diverse perspectives, which addresses the issue of limited perspectives when using field collected data, (ii) diverse backgrounds to auto-generate data sets with challenging adjacent imagery, such as a white aircraft in a snowy environment, occlusion rendering, which addresses the issue of practical mock-up occlusions in the field, and (iii) generating unique visual artifacts such as variable weather, lens flare, and lighting. A technical effect of implementations (e.g. computer program products) herein include reduced processing time on a computer to generate environment data for airports that have previously not been visited. A technical effect of implementations includes improved fidelity of accuracy of object recognition by machine learning models.

FIG. 1 illustrates a method of autonomous vehicle training according to various implementations of the present disclosure. The example of the method 100 illustrated in FIG. 1 is for illustration only. Other examples of the method 100 can be used or implemented without departing from the scope of the present disclosure. In various implementations, the method 100 can be implemented by the electronic device 1200 illustrated in FIG. 12 as described herein.

In operation 110, the electronic device 1200 executes a dataset generation engine. In various implementations, the dataset generation engine includes one or both of a simulation engine with a digital twin dataset 112 and a synthetic dataset generation engine 114. In some implementations, the digital twin dataset 112 uses recorded flight data, simulation playback, and emulated sensors to create a synthetic dataset including a synthetic image that is paired, or associated with a real image and determines a realism gap between the real image and the synthetic image. The real and synthetic images are calibrated together such that one corresponds to the other. The synthetic dataset generation engine 114 uses synthetic flight data, simulation playback, and emulated sensors to create a realistic synthetic dataset, such as a realistic synthetic image, corresponding to the synthetic flight data. The simulation engine with the digital twin dataset 112 is described in greater detail below with respect to FIG. 6 and the synthetic dataset generation engine 114 is described in greater detail below with respect to FIG. 8. The execution of both the digital twin dataset 112 and synthetic dataset generation engine 114 generates data including real images previously captured by a vehicle camera, such as an in-flight camera, and synthetic images that correspond to the real images. In some implementations, the operation 110 includes labeling the generated datasets in preparation for machine learning. In some examples, the vehicle camera is an aircraft camera that captures images during aircraft operations, such as on the ground (e.g., during taxi operations) or in the air (e.g., during flight).

In operation 120, the electronic device 1200 performs machine learning using the datasets generated by the dataset generation engine in operation 110. In some implementations, the electronic device 1200 learns the labeled images generated in operation 110 in order to be able to identify particular real objects (e.g. physical objects) or locations associated with the labeled images at a later point in time. In one implementation, the machine learning in operation 120 includes a build perception function that generates data for environments, such as an airport, which has previously not been visited. For example, the machine learning includes simulated landings to prepare an aircraft for automatic landing in a location that previously has not been visited. In one implementation, the machine learning prepares the electronic device 1200 to identify a runway and estimate a visual pose to determine how far away the electronic device 1200 is from the runway touchdown point.

In operation 130, the electronic device 1200 measures the realism gap between the real image and the synthetic image corresponding to the real image. In one implementation, the electronic device 1200 labels the synthetic image with a metric to quantify how realistic is the synthetic image. In another implementation, a classifier classifies the synthetic image and the electronic device 1200 compares the classification to the classification of the real image. In one implementation, the classification is made on a sliding scale, where some synthetic images are classified as more realistic than others. For example, for a real image that is classified as cloudy—grass—runway—tree, an associated synthetic image with a minimal realism gap is also classified as cloudy—grass—runway—tree. An associated synthetic image classified as cloudy—grass—runway—bush would have a greater realism gap and an associated synthetic image classified as cloudy—dirt—runway—bush would have a still greater realism gap because a greater number of features are incorrectly labeled. In other implementations, the classification is binary. For example, the synthetic image is classified as realistic based on a certain number of features being labeled correctly or not realistic based on the certain number of features not being labeled correctly. In one implementation, the classifier is an element of the electronic device 1200, such as the classifier 1250. In another implementation, the classifier is external to the electronic device 1200, and the electronic device 1200 receives the classification of the corresponding synthetic image of the known environment. Based on the results of the comparison between the classification, the electronic device proceeds to either operation 140 or 150. In another implementation, an additional loss function of the electronic device 1200 or generative adversarial network (GAN) described in reference to operation 220 GAN scores the semantic segmentation success of unseen, real images to measure the realism gap. For example, the semantic segmentation includes individually controlled domain transfers that transfer certain elements, such as foliage, lighting, etc. from the synthetic domain to the real domain, or vice versa, without requiring a specific set of domain templates. The controlled domain transfers allow elements to be changed from domain to domain, such as from summer to winter, day to night, and visible light to the infrared (IR) spectrum, while maintaining the other elements of the scene.

In some implementations, the realism gap measures only a particular object in the image, rather than the entire image. For example, a real image includes a concrete runway with trees on each side of the runway and a synthetic image includes a concrete runway with grass on each side of the runway. The runway is the object in the image to be identified and the trees are determined to be extraneous. An identification that classifies the runway as identified correctly but classifies the trees as identified incorrectly is sufficient in operation 130 when the realism gap measures only a particular object or multiple particular objects.

In operation 140, based on the electronic device 1200 determining that the measured realism gap is not above a threshold, i.e. the synthetic image does not closely enough resemble the real image, the electronic device 1200 generates additional data. In various implementations, the electronic device 1200 receives, or accesses, more real data by either performing, or controlling to perform, additional flights to gather real data or by accessing more real data previously collected, or by generating additional synthetic data via operation 110. For example, the electronic device 1200 generates additional synthetic images and execute operations 110-130 until the realism gap is determined to be of a sufficient size.

In operation 150, based on the electronic device 1200 determining that the measured realism gap is at or above the threshold, i.e. the synthetic image closely enough resembles the real image, the electronic device 1200 deploys a model that allows electronic devices, such as the electronic device 1200 implemented in an aircraft, to identify objects in previously unknown environments without additional flights to gather the data.

It should be noted that as used herein, "real" when used in connection with objects, images, data, etc., refers to actual non-synthesized objects, images, data, etc. That is, "real" refers to, for example, actual physical objects, images acquired by a camera, data acquired by a senor or other data acquisition device, etc.

Figure 2A:
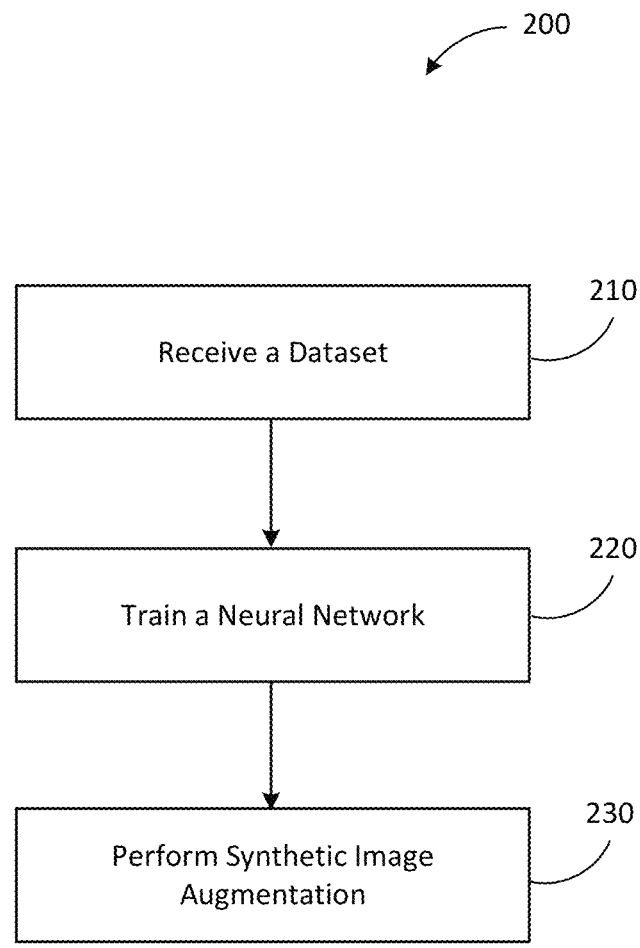
FIG. 2A illustrates a method of data generation and training according to various implementations of the present disclosure.

FIG. 2A illustrates a method of data generation and training according to various implementations of the present disclosure. The example of the method 200 illustrated in FIG. 2A is for illustration only. Other examples of the method 200 can be used or implemented without departing from the scope of the present disclosure. In various implementations, the method 200 can be implemented by the electronic device 1200 illustrated in FIG. 12 as described herein.

In operation 210, a dataset is received. The dataset includes images previously captured by a vehicle camera. In one implementation, the vehicle is an aircraft and the images were captured during a flight operation in a plurality of known environments. In other words, at least one image is captured of each of a plurality of environments. Each of the images include real image features of objects in the image. In one implementation, the images are red, green, blue (RGB) images that include at least a first real object in the known environment. In another implementation, the images are mono-channel images (greyscale image, or infrared image) or a 3rd order image tensor (RGB image). It should be appreciated that the present disclosure can be implemented in different environments, in different operating conditions, etc., such as in different aircraft operations or non-aircraft operations. It should also be appreciated that the present disclosure can implemented with different vehicles, such as other air vehicles (e.g., other flying vehicle or apparatus) and non-air vehicles (e.g., a ground transportation vehicle or apparatus).

In operation 220, a neural network, such as the GAN, is trained to recognize the first real image features in the received dataset. The GAN, through machine learning, is trained to recognize the first real image features in the known environment by associating one of the previously captured images of the one of the plurality of known environments in the received dataset to a synthetic image that corresponds to the previously captured image in the dataset. In one implementation, the synthetic image is pre-stored. In another implementation, the synthetic image is generated in real-time at the time of use.

The GAN compares the synthetic image to the real image and, by correlating features in the associated real and synthetic images, learns the particular features of the real image, including the first real object to generate a more realistic version of the synthetic image. In some implementations, training the GAN includes measuring a realism gap between the associated one of the RGB images and the pre-stored synthetic image corresponding to the RGB image. In some implementations, the realism gap is measured between the associated one of the RGB images and the synthetic image corresponding to the RGB image in real-time. The realism gap, as described above, is measured by receiving a performance metric of the corresponding computer vision function as applied to the known environment and comparing the performance metric of the corresponding synthetic image of the known environment to a threshold. The realism gap is a determination of a realism difference between the performance metric of the computer vision function for recognizing a real image of the known environment and a corresponding performance metric of the computer vision function for recognizing a synthetic image of the known environment as described herein.

In operation 230, the electronic device 1200 performs synthetic image augmentation to generate synthetic image features of a synthetic object corresponding to the first real image features of the first real image in the received dataset using the GAN (e.g., a synthetic object based on the real object). Once completed, the synthetic image augmentation allows for improved training of a computer vision function for recognizing second real image features, corresponding to the synthetic image features, in a real-world environment that is previously unknown prior to the recognizing of the second real image features.

In some implementations, the accuracy of the classification of the corresponding synthetic image of the known environment is not above the threshold. In these implementations, the electronic device 1200 determines an insufficient data representation in the synthetic image augmentation, updates the synthetic image augmentation to include additional features (e.g., add characteristics to the augmentation) corresponding to the insufficient data representation, and receives an updated performance metric for the corresponding synthetic image based on the updated synthetic image augmentation.

In one implementation, the aircraft includes the in-flight camera that previously captured the original RGB images in operation 210. In some implementations, in the method 200, the electronic device 1200 further generates a virtual airport environment corresponding to the computationally derived position of an aircraft or recorded position from the aircraft. The electronic device 1200 further generates a corresponding synthetic image based on the position of the vehicle, The computer vision function for recognizing the second real image features in the real-world environment corresponds to the synthetic image in the virtual airport environment.

In some implementations, in the method 200, the electronic device 1200 segments the image of the previously captured images to isolate the first real image features, focuses on the isolated first real image features using the GAN, and generates the synthetic image augmentation of the isolated first real image features using the GAN. In some implementations, the electronic device 1200 imports pre-labeled data to label the synthetic image features corresponding to the real image features in the generated synthetic image augmentation. In one example, the synthetic image augmentation includes the synthetic image features and a dynamic, auxiliary image feature.

Figure 2B:
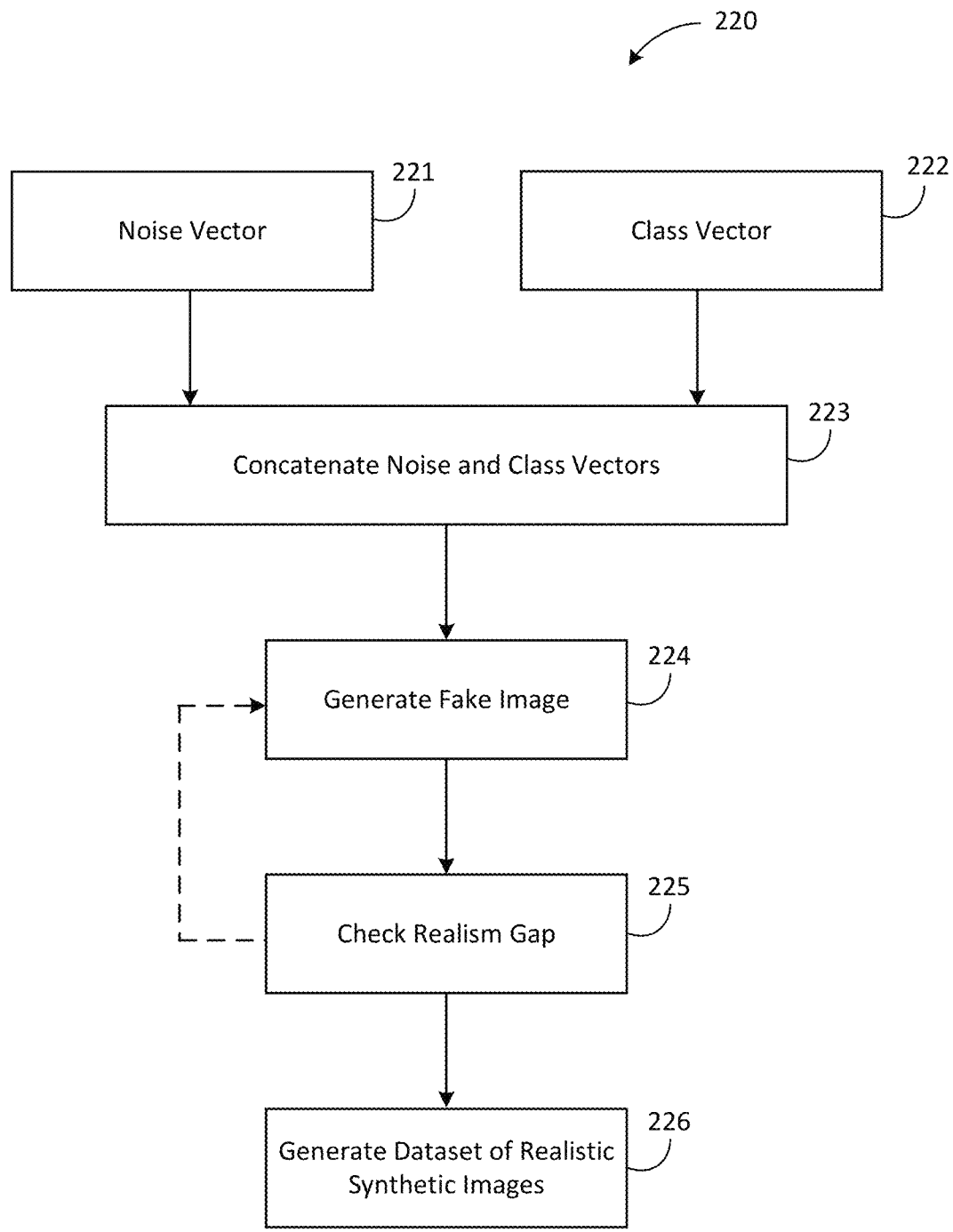
FIG. 2B illustrates a method of training a neural network according to various implementations of the present disclosure.

FIG. 2B illustrates a method of training the GAN according to various implementations of the present disclosure. In particular, FIG. 2B illustrates a method of training the GAN 220 as described in FIG. 2A. The example of the method 220 illustrated in FIG. 2B is for illustration only. Other examples of the method 220 can be used or implemented without departing from the scope of the present disclosure. In various implementations, the method 220 can be implemented by the electronic device 1200 illustrated in FIG. 12 and described below.

In various implementations, training the GAN 220 utilizes both conditional and unconditional GAN models. The unconditional layer relies on diversity of data and neural network layers to understand features in the images and transfer the style of the image from synthetic to real for a full frame of images. The conditional layer introduces class vectors, which are concatenated with noise vectors to apply visual styles for each class of data.

In operation 221, the electronic device 1200 executes a noise vector to generate new, fake images. In operation 222, the electronic device executes a class vector to generate fake images specific to a particular environment. In one implementation, the particular environment is a runway or airport type. In operation 223, the electronic device concatenates the noise vector 221 and class vector 222 to apply visual styles for each class of data. In various examples, the fake images are generated or synthesized images. That is, the fake images are not real or captured images, but instead are generated by the GAN to represent, for example, a "hypothetical" environment.

In operation 224, the electronic device 1200 generates a fake image of the environment. For example, when the real domain includes an airport with a city landscape, urban buildings, and urban views, the concatenated class-noise vector holds all other features, such as sky, runway, and roads fixed while the electronic device 1200 generates new fake airport images in the urban and city environment. Similarly, the electronic device 1200 executes this architecture to generate different seasons, time of day environments such as day or night, atmospheric conditions such as clear or foggy, etc.

In operation 225, the electronic device 1200 executes a discriminator to verify an accuracy of the realism gap of the generated fake image. The realism gap can be verified as described above in the description of operation 130. If the realism gap is too great, indicating the accuracy of the generated fake image is insufficient, the electronic device 1200 returns to operation 224 to generate additional images and/or augment the generated images to improve the accuracy of the realism gap. If the image is sufficiently accurate, indicated by the realism gap being sufficiently small, the electronic device 1200 proceeds to operation 226. In operation 226, based on the realism gap being sufficiently accurate, the electronic device 1200 generates a dataset of realistic, synthetic images created in operation 224 and checked in operation 225. The dataset can be stored in a memory, such as the memory 1220.

Figure 3A:
FIGS. 3A and 3B illustrate example images used in the synthetic dataset generation engine according to various implementations of the present disclosure.
Figure 3B:
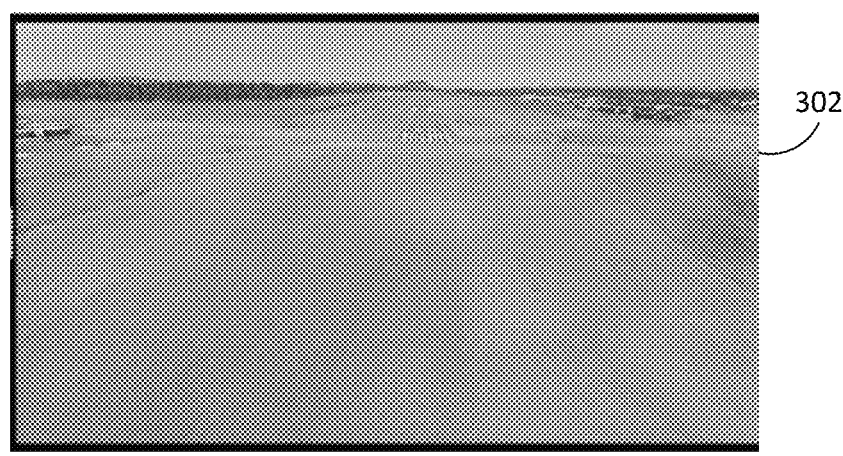

FIGS. 3A and 3B illustrate example images used in the synthetic dataset generation engine 114 according to various implementations of the present disclosure. The images illustrated in FIGS. 3A and 3B are for illustration only. Other examples of the images can be used or implemented without departing from the scope of the present disclosure.

FIG. 3A illustrates a real image 300 obtained by an in-flight camera onboard an aircraft. FIG. 3B illustrates a realistic, synthetic image 302 corresponding to the real image 300. The realistic, synthetic image 302 can also be described as associated with or paired with the real image 300. In some implementations, the real image 300 is a red, green, blue (RGB) image captured by an onboard camera, such as the camera 1240. The real image 300 is distorted, such as elongated, indicating the lens of the in-flight camera that captured the real image 300 was a fisheye type lens intended to capture a wide field of view. The real image 300 is unchanged from its original state. In other words, the real image 300 has not been doctored or edited to enhance certain features. For example, the real image 300 shows the shadow of the aircraft from which the image is taken and distinct gradients of color on the ground, such as due to the direction the grass was mowed. In contrast, the realistic, synthetic image 302 does not include the shadow of the aircraft and less distinct gradients of color on the ground. In some implementations, the shadow is not included in the realistic, synthetic image 302 because the synthetic image is intended to illustrate the environment itself. The shadow is present in the real image 300 only because of the presence of the aircraft and therefore not a true feature of the environment captured in the real image 300. In another implementation, the shadow is not included in the realistic, synthetic image 302 because, if included, the shadow could be mistaken for a feature in the environment to be labeled.

In contrast to the distorted view of the real image 300, the realistic, synthetic image 302 is flattened and appears closer to an image captured by a traditional lens, in other words a non-fisheye type lens. The synthetic dataset generation engine 114 analyzes the domain of the image, such as the environment captured in the real image, determines factors that can be different than in the real image 300, and flattens the data when possible. For example, the road that is seen horizontally traversing the picture in both the real image 300 and the realistic, synthetic image 302 is flattened in the realistic, synthetic image 302 to appear more how the road realistically appears in the environment. This appearance helps the electronic device 1200 to learn the environment in a manner that allows the electronic device 1200 to recognize objects more accurately in the environment during later flights.

Figure 4A:
FIGS. 4A, 4B, and 4C illustrate example images used in the synthetic dataset generation engine according to various implementations of the present disclosure.
Figure 4B:
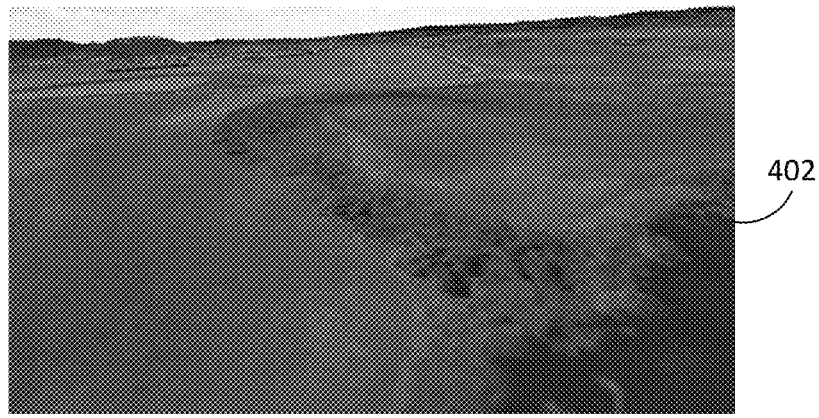
Figure 4C:

FIGS. 4A, 4B, and 4C illustrate example images used in the synthetic dataset generation engine 114 according to various implementations of the present disclosure. The images illustrated in FIGS. 4A, 4B, and 4C are for illustration only. Other examples of the images can be used or implemented without departing from the scope of the present disclosure.

FIG. 4A illustrates a real image 400 obtained by an in-flight camera onboard an aircraft. FIG. 4B illustrates a synthetic image 402 corresponding to the real image 400. FIG. 4C illustrates a realistic, synthetic image 404 corresponding to the real image 400. In some implementations, the real image 400 is an RGB image captured by an onboard camera, such as the camera 1240. The real image 400 is distorted, such as elongated, indicating the lens of the in-flight camera that captured the real image 400 was a fisheye type lens intended to capture a wide field of view. The real image 400 is unchanged from its original state. In other words, the real image 400 has not been doctored or edited to enhance certain features. The synthetic image 402 is flattened similarly to the realistic, synthetic image 302 in FIG. 3B, but shows less texture and details in the image than the real image 400. The realistic, synthetic image 404 is flattened like the synthetic image 402 to show a viewpoint that is more realistic than the synthetic image 402 while retaining the texture and detail of the real image 400. Accordingly, the realistic, synthetic image 404 provides a more realistic synthetic image than the synthetic image 402 by better training the GAN model to recognize and identify features in a realistic environment.

In addition, the realistic, synthetic image 404 maintains focus on the objects of interest in the environment shown in the real image 400 while cropping only objects or areas of the real image 400 deemed unnecessary. For example, the real image 400 illustrates a greater amount of the body of water on the right of image than the realistic, synthetic image 404. However, because this is not a feature of interest in the particular environment, the realistic, synthetic image 404 includes enough of the body of water to be identified but, because the body of water is not deemed a feature of interest, crops out an unnecessary amount in order to focus on elements of the environment that are deemed to be features of interest.

Figure 5A:
FIGS. 5A, 5B, and 5C illustrate example images used in the simulation engine with digital twin dataset according to various implementations of the present disclosure.
Figure 5B:
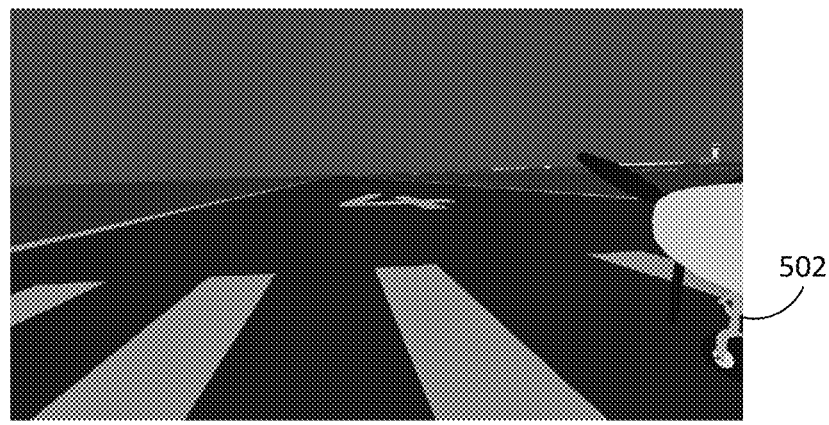
Figure 5C:

FIGS. 5A, 5B, and 5C illustrate example images used in the simulation engine with digital twin dataset 112 according to various implementations of the present disclosure. The images illustrated in FIGS. 5A, 5B, and 5C are for illustration only. Other examples of the images can be used or implemented without departing from the scope of the present disclosure.

FIG. 5A illustrates a real image 500 obtained by an in-flight camera onboard an aircraft. FIG. 5B illustrates a semantic image 502 synthetically generated based on GPS recordings of the same flight tests that were used to capture the real image 500. FIG. 5C illustrates a virtual image 504 the synthetically generated based on GPS recordings of the same flight tests that were used to capture the real image 500. In some implementations, the real image 500 is an RGB image captured by an onboard camera, such as the camera 1240. The real image 500 is unchanged from its original state. In other words, the real image 500 has not been doctored or edited to enhance certain features. The semantic image 502 is created by semantic image segmentation, where each pixel belonging to a particular feature receives the same label or classification. For example, each pixel of the white lines on the runway receives the same label, each pixel of the runway, not including the white lines, receives the same label, and each pixel of the sky receives the same label. The virtual image 504 is created based on the semantic image 502 and created to match the real image 500 as closely as possible. Accordingly, the virtual image 504 more closely matches the real image 500 than the semantic image 502. For example, the virtual image 504 includes the shadow of the aircraft and clouds, which are shown in the real image 500 but not the semantic image 502. The differences between the real image 500 and the virtual image 504 are measured by a realism gap as described above in operation 130. For example, the electronic device 1200 measures and quantifies the realism difference between the real image 500 and the virtual image 504. Measuring and quantifying the realism difference maintains an accuracy of the generated images, such as the virtual image 504.

Figure 6:
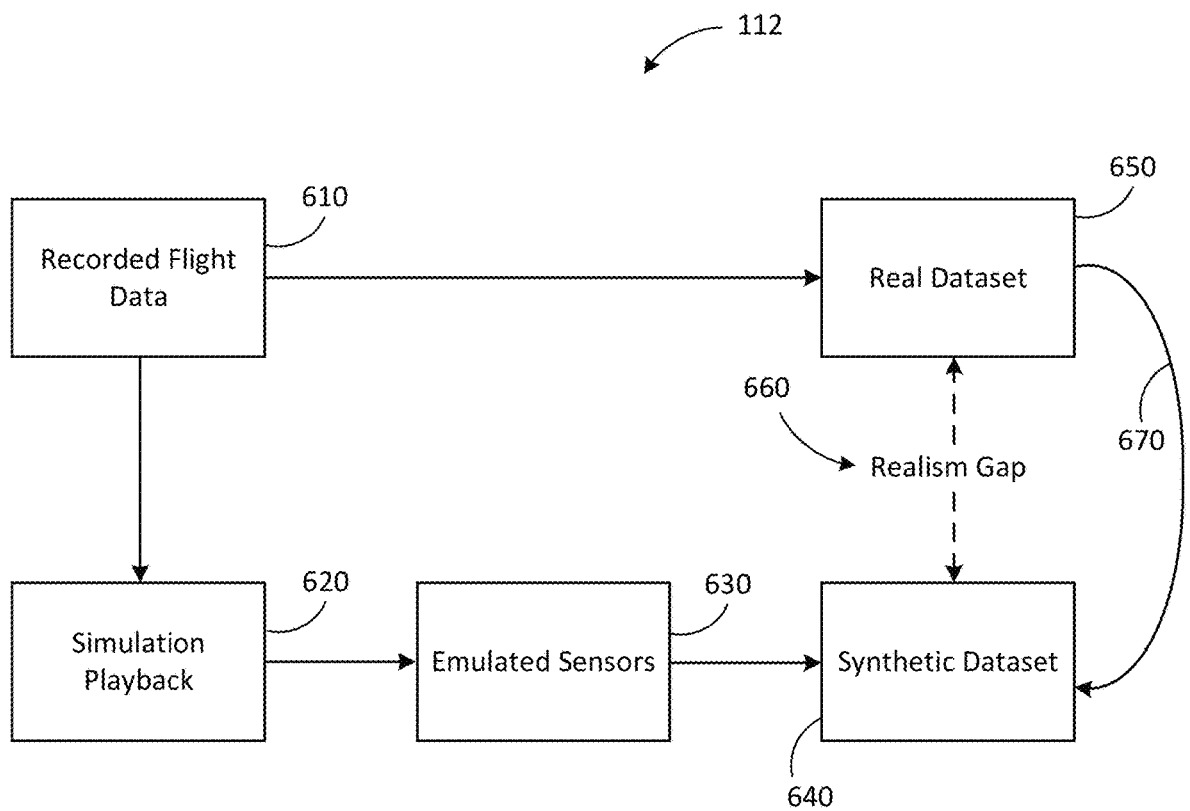
FIG. 6 illustrates a method of the simulation engine with a digital twin dataset according to various implementations of the present disclosure.

FIG. 6 illustrates a method of the simulation engine with a digital twin dataset according to various implementations of the present disclosure. The example of the method 112 illustrated in FIG. 6 is for illustration only. Other examples of the method 112 can be used or implemented without departing from the scope of the present disclosure. In various implementations, the method 112 can be implemented by the electronic device 1200 illustrated in FIG. 12 and described below. As described herein, the method of the simulation engine with a digital twin dataset 112 is part of the dataset generation engine 110 described in the description of FIG. 1 above.

In operation 610, the electronic device 1200 receives and records flight data. The flight data is captured by an in-flight camera onboard an aircraft and includes GPS data and image data. The GPS data is captured by a sensor, such as a GPS sensor, to determine a location of the aircraft for the image data. Examples of recorded image data includes the real images 300, 400, and 500 illustrated in FIGS. 3A, 4A, and 5A, respectively. In one implementation, the real images 300, 400, and 500 illustrated in FIGS. 3A, 4A, and 5A, respectively further include or are associated with the GPS data to determine the location of each image around the world. In particular, the GPS data is used to determine or identify a particular environment, such as an airport, that is captured by the in-flight camera.

In operation 620, the electronic device 1200 executes a simulation playback. In other words, the electronic device 1200 plays a simulation of the recorded flight data from operation 610. During the playback, the electronic device 1200 reviews the images of the environment, such as the airport, captured by the in-flight camera. In some implementations, the recorded flight data includes several different environments, lighting conditions, weather conditions, number of cameras, etc. which can include hundreds of hours of data. The simulation playback plays back some or all of the data. In one implementation, the method 112 focuses on a single environment, such as a particular airport, and plays back flight data from that environment in various conditions such as night and day, sunny and cloudy, from several different on-board cameras of the aircraft. In another implementation, the method 112 focuses on a single variable, such as nighttime conditions, and plays back all the flight data from all environments captured in nighttime scenarios. In yet another implementation, the method 112 does not focus on a single environment and plays back all of the flight data.

In operation 630, the electronic device 1200 emulates sensors on the aircraft of the playback simulation. In one implementation, the electronic device 1200 emulates GPS/inertial measurement unit (IMU) sensors onboard the aircraft to determine the data the GPS/IMU sensors would capture if the simulated playback were being performed in real time. In some implementations, the emulated sensors include a plurality of cameras, such as the camera 1240, that is an in-flight camera onboard the aircraft. The electronic device 1200 controls which of the plurality of cameras capture data at a particular time in a configurable environment, such as a particular airport captured in the recorded flight data. In some implementations, the aircraft is in a configurable state, such as stationary, taxiing prior to takeoff, landing, or in flight.

In operation 640, the electronic device 1200 generates a synthetic dataset based on the data of the emulated sensors and the simulated playback. In one implementation, the electronic device 1200 performs semantic image segmentation to generate an image such as the semantic image 502 and use the semantic image 502 to generate a virtual image 504. As virtual images are created, the images are compiled to create the synthetic dataset. In some implementations, the synthetic dataset is generated using machine learning as described herein in connection with operation 120. For example, generating the synthetic data further includes labeling the data of the emulated sensors and the simulated playback based on a similarity of imported labeled data or other data that has been previously labeled.

In operation 650, the electronic device 1200 generates a real dataset based on the recorded flight data in operation 610. For example, the electronic device 1200 generates an image such as the real image 500 using the recorded flight data. In some implementations, the real image 500 is generated by isolating a particular frame of video data from the recorded flight data. In other implementations, the real image 500 is image data captured by the in-flight camera onboard the aircraft. As multiple images are created, the dataset comprising a plurality of real images 500 is generated.

In one implementation, the real dataset generated in operation 650 and the synthetic dataset generated in operation 640 are analogous. In other words, for each real image in the real dataset, a virtual or synthetic image is generated in the synthetic dataset. Likewise, for each synthetic image generated in the synthetic dataset, a real image is generated in the real dataset. In operation 660, a realism gap between a real image 500 and the corresponding synthetic image 504 is measured. In some implementations, the realism gap is measured by a classifier in the electronic device 1200. In other implementations, the realism gap is measured by an external classifier that sends the classification to the electronic device 1200.

Measuring the realism gap increases the likelihood of a realistic simulation and increases the viability of models trained using the real and synthetic datasets to more accurately detect objects when the model is later deployed in a flight. As described herein in connection with operation 130, in some implementations an accuracy of the classification is measured on a sliding scale with a particular threshold indicating the realism gap is sufficiently small, and in other implementations an accuracy of the classification is binary and the image is determined to be either sufficiently realistic or not sufficiently realistic. In some implementations, the realism gap is below the accuracy threshold, indicating the synthetic image is insufficient for inclusion in the synthetic dataset. There are several possible reasons for the realism gap to be below the accuracy threshold. For example, the texture representation of the synthetic image can be incorrect or the rendered environment can be mismatched. Potentially mismatched rendered environment features include an incorrect map alignment, sensor extrinsic errors, and incorrect ownership data, among others.

In operation 670, the electronic device 1200 trains the realism GAN to generate additional datasets of previously unknown environments. For example, the realism GAN generates a synthetic dataset of an airport for which no recorded flight data is available. The GAN provides the ability to generate a limitless variety of image augmentations including environmental features, sensor imperfections, and other potential imperfections in data collections. The GAN is described in greater detail below.

Figure 7:
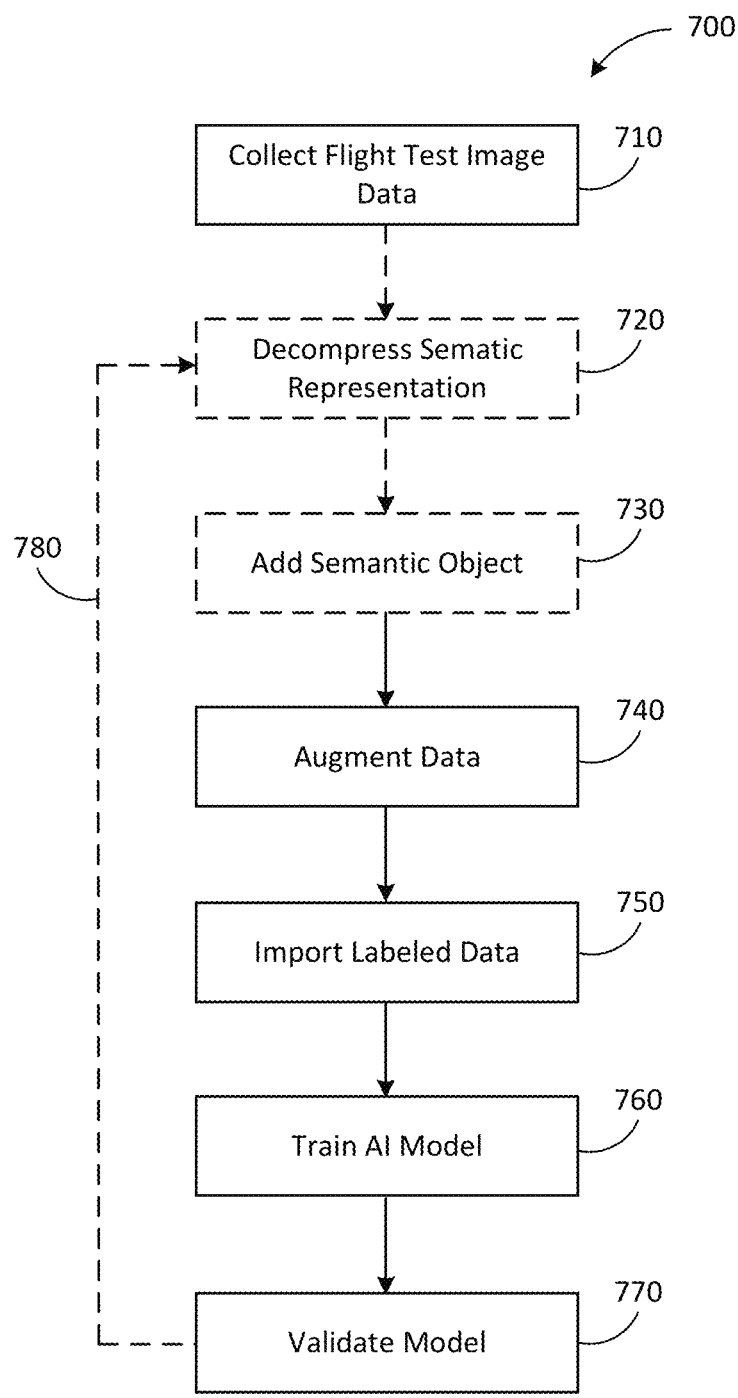
FIG. 7 illustrates a method of training and validating a model according to various implementations of the present disclosure.

FIG. 7 illustrates a method of training and validating a model according to various implementations of the present disclosure. The example of the method 700 illustrated in FIG. 7 is for illustration only. Other examples of the method 700 can be used or implemented without departing from the scope of the present disclosure. In various implementations, the method 700 can be implemented by the electronic device 1200 illustrated in FIG. 12 and described below.

In operation 710, the electronic device 1200 collects flight test image data. In some implementations, the image data is the image data captured in operation 610 of the method 600. In some implementations, the collection of flight test image data refers to receiving or accessing flight test image data previously collected. In other implementations, the collection of flight test image data refers to the image data being captured by an in-flight camera onboard an aircraft and includes GPS data and image data. The GPS data is captured by a sensor, such as the GPS sensor, to determine a location of the aircraft for the image data. Examples of image data includes the real images 300, 400, and 500 illustrated in FIGS. 3A, 4A, and 5A, respectively. In one implementation, the real images 300, 400, and 500 illustrated in FIGS. 3A, 4A, and 5A, respectively further include or are associated with the GPS data to determine the location of each image around the world. In particular, the GPS data is used to determine or identify a particular environment, such as an airport, that is captured in the image data by the in-flight camera.

In operation 720, the electronic device 1200 decompresses semantic representations in the flight test image data (e.g., using image decompression techniques). The decompression of the semantic representations allows the image data to be modified. In operation 730, the electronic device adds a semantic object into the decompressed flight test image data. In some implementations, the semantic object is a stationary object that is the focus of particular image. In other implementations, the semantic object is a stationary object but auxiliary of the focus of the particular image. For example, the focus of an image of a runway is the runway and trees or a lake, such as illustrated in image 404, and auxiliary objects are added to the image. In still other implementations, the semantic object is a dynamic, auxiliary object. For example, the focus of an image of a runway is the runway and a moving aircraft is added to the image. By adding a dynamic object such as a moving aircraft, the synthetic dataset is usable for an aircraft to learn object avoidance without practicing avoiding objects in real time.

In some implementations, one or both of operations 720 and 730 are not performed without departing from the scope of this disclosure. In these implementations, the decompression of the semantic representation or the addition of a semantic object is not needed for the model to be trained for a particular image. For example, a remote airport environment with few people or vegetation does not have additional objects to be added to sufficiently learn the image. In some implementations, operations 720 and 730 are combined and performed as elements of operation 740.

In operation 740, the electronic device 1200 augments, or modifies, the data. In implementations where operations 720 and 730 were performed, the electronic device 1200 augments the data that includes the added semantic object. In implementations where operations 720 and 730 were not performed, the electronic device 1200 augments the flight test image data received in operation 710. In particular, by augmenting the data, the electronic device 1200 adds elements to the data to expand the sample space and improve performance of the training model. In various implementations, the electronic device 1200 augments the rendered environment. For example, the electronic device 1200 adds auxiliary objects, such as trees or additional buildings, to the data that are not the focus of the image or adds primary objects, such as obstacles, to the data that are the focus of the image. In other implementations, the electronic device 1200 augments the data by adding or updating characteristics of the data. For example, the electronic device 1200 updates the weather to include rain or snow or the electronic device 1200 updates the time of day from day to night or vice versa. The electronic device 1200 augments the data in some examples, in sequential separate augmentation models so that multiple augmentations are performed without limiting the model to a single augmentation at a time. For example, in one implementation the sequential augmentation models add a semantic object, such an obstacle, add a particular weather condition, such as rain, and add a time of day, such as nighttime, to the data. In some implementations, the added object is dynamic rather than stationary.

In some implementations, the electronic device 1200 augments sensor or camera imperfections in the data. For example, in various implementations the sensor or camera collecting the data has imperfections leading to imperfections in the data, such as lens flare, dust accumulation, rain drops, snow, bug splatter, lens cracks, blurriness, sensor noise, or intrinsic imperfections in the hardware or software. These imperfections in the data are corrected by augmentation of the data as described herein. In one implementation, the imperfection is labeled or recognized by the electronic device 1200 and the electronic device corrects the imperfection by isolating the imperfect pixels, removing the imperfect pixels, and extrapolating the surrounding, correct pixels.

In operation 750, the electronic device 1200 imports labeled data. In some implementations, the labeled data is imported from previous iterations of the method 700. In other implementations, the labeled data is imported from an external source. The imported labeled data is used as a reference by the electronic device 1200 to label the augmented flight test image data. In some implementations, the imported labeled data includes information on the objects labeled in the data. For example, a labeled runway includes information that the runway is a target landing area for an aircraft and therefore, avoidance of the runway is not needed. A labeled tree includes information that the tree is an obstacle and avoidance of the tree is needed. In some implementations, the imported labeled data includes additional information such as dimensions of the object, how common the object is, additional objects similar to the object, and any variations on the object. For example, labeled data for a pine tree might include that the pine tree is on average fifty feet tall, is present in seven percent of labeled images, similar objects are fir trees and spruce trees, and variations include pine trees with and without leaves, depending on the season of year.

In operation 760, the electronic device 1200 trains an AI model using the imported labeled data. In particular, the electronic device 1200 uses the imported labeled data to teach the AI model the features in the augmented image that correspond to the imported labeled data. For example, the AI model is taught to identify an object, such as a runway, in the augmented image and correlate the runway in the augmented image to a runway in the labeled data. When the runway in the labeled data is identified, the AI model applies the imported label to the corresponding runway in the augmented image. Using this training method, the AI model identifies and labels each object in the augmented image in an automated manner. For a particular dataset, such as the dataset generated in the dataset generation engine 110, each augmented image is labeled and learned in this manner. In addition to labeling the augmented images, the electronic device 1200 learns the objects and images as operation 760 proceeds and stores the learned, labeled images as a learned dataset in a memory, such as the memory 1220 described in greater detail below.

In operation 770, the electronic device 1200 validates the trained AI model trained in operation 760. In some implementations, the validation is performed as a simulation to test the accuracy of the trained AI model. For example, the electronic device 1200 creates, or generates, a scenario or environment. The environment can be a known environment, such as an airport, or a computer or human generated simulated environment. The generated environment in some examples includes realistic looking features including shadows, lighting, weather conditions, time of day, and one or more objects to be detected. Then, the electronic device 1200 executes the model to determine the ability of the model to recognize and properly identify the one or more objects to be detected. The electronic device 1200 determines an accuracy of the identification of the one or more objects. In some implementations, the model is executed in more than one generated environment to increase the accuracy of the model.

In one implementation, the generated environment is an airport. The airport environment includes a runway with trees on the left side and a body of water on the right. The airport environment further includes a stationary aircraft on the right side of the runway and a dynamic vehicle, such a truck, moving across the runway from the trees toward the stationary aircraft. The model is executed to measure the ability of the model to identify the runway, the trees, the body of water, the aircraft, that the aircraft is stationary, the vehicle, and that the vehicle is dynamic. Based on the identifications, the electronic device 1200 measures the ability of the model to determine that the runway is the target landing area while the trees, body of water, aircraft, and vehicle are to be avoided.

By validating the trained AI model, the electronic device 1200 identifies weaknesses in the data representation. Using the example above, based on the model identifying the runway, the trees, the body of water, the aircraft, that the aircraft is stationary, the vehicle, and that the vehicle is dynamic, but not identifying that the aircraft is an object to be avoided, the electronic device 1200 determines the data needs to be updated further. Accordingly, in operation 780, the electronic device 1200 returns to operation 720 to prepare the image for additional augmentation. From there, the electronic device 1200 executes operations 720-770 until each element of the image is correctly identified.

Figure 8:
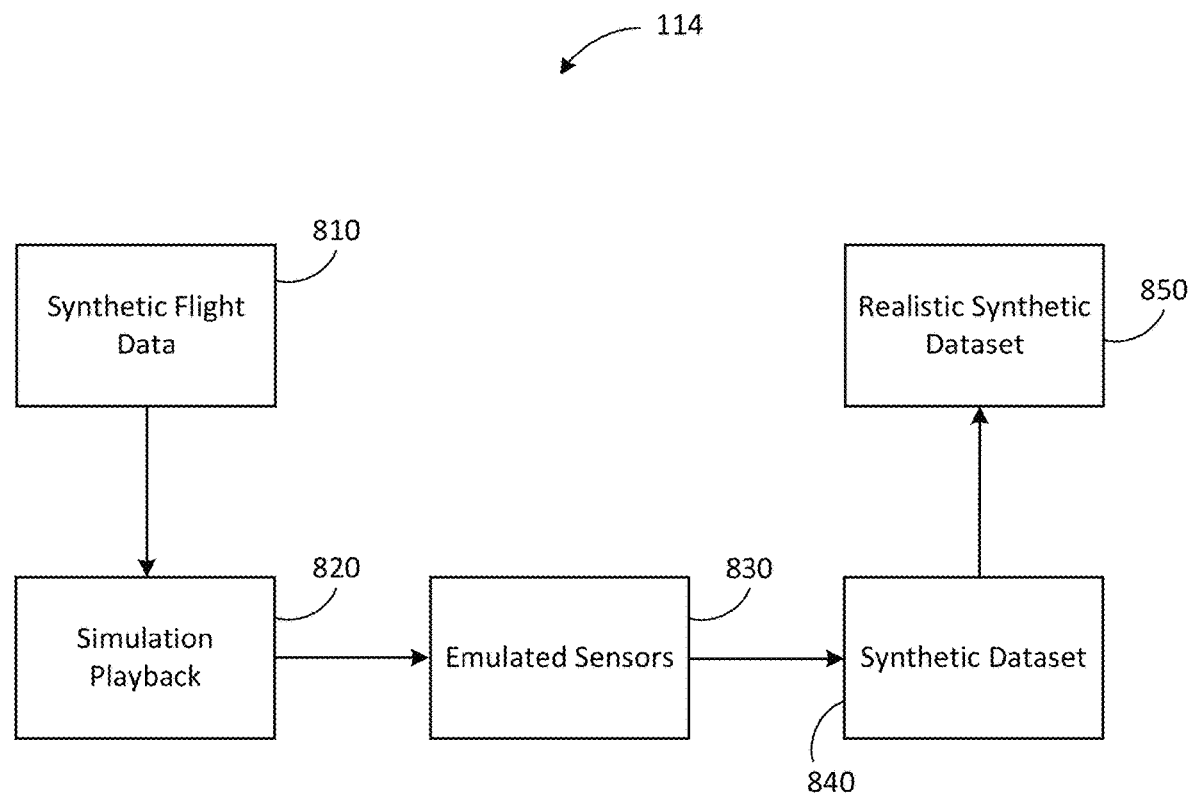
FIG. 8 illustrates a method of the synthetic dataset generation engine according to various implementations of the present disclosure.

FIG. 8 illustrates an example method of the synthetic dataset generation engine according to various implementations of the present disclosure. The example of the method 114 illustrated in FIG. 8 is for illustration only. Other examples of the method 114 can be used or implemented without departing from the scope of the present disclosure. In various implementations, the method 800 can be implemented by the electronic device 1200 illustrated in FIG. 12 and described below. As described herein, the method of the synthetic dataset generation engine 114 is part of the dataset generation engine 110 described in the description of FIG. 1 above.

In operation 810, the electronic device 1200 generates synthetic flight data. The flight data in operation 810 is computer generated and not necessarily indicative of a real environment. For example, in contrast to the recorded flight data recorded and received in operation 610, which includes real features of real environments located at specific GPS coordinates, the synthetic flight data is designed to look realistic to an AI model but is not necessarily able to be mapped to specific GPS coordinates. However, the number of airport environments in the world can potentially lead to a synthetic, computer generated airport environment that appears similar to a real airport environment. In other implementations, the synthetic flight data is generated based on a real environment, such as a specific airport.

In operation 820, the electronic device 1200 executes a simulation playback. In other words, the electronic device 1200 plays a simulation of the synthetic flight data from operation 810. During the playback, the electronic device 1200 reviews the images of the environment, such as the airport. In some implementations, the synthetic flight data includes several different environments, lighting conditions, weather conditions, number of cameras, etc. The simulation playback plays back some or all of the data. In one implementation, the method 114 focuses on a single environment, such as a particular airport, and plays back flight data from that environment in various conditions such as night and day, sunny and cloudy, from several different on-board cameras of the aircraft. In another implementation, the method 114 focuses on a single variable, such as nighttime conditions, and plays back all the flight data from all environments generated in nighttime scenarios. In yet another implementation, the method 114 does not focus on a single environment and plays back all of the generated data.

In operation 830, the electronic device 1200 emulates sensors on the aircraft of the playback simulation. In particular, the electronic device 1200 can emulate GPS/IMU sensors onboard an aircraft to determine the data the GPS/IMU sensors would capture if the simulated playback were being performed in real time. In some implementations, the emulated sensors include a plurality of cameras, such as the camera 1240, that is an in-flight camera onboard the aircraft. The electronic device 1200 can control which of the plurality of cameras synthetically capture data at a particular time in a configurable environment, such as a particular airport in the synthetic data. In some implementations, the aircraft is in a configurable state, such as stationary, taxiing prior to takeoff, landing, or in flight.

In operation 840, the electronic device 1200 generates a synthetic dataset based on the data of the emulated sensors and the simulated playback. For example, the electronic device 1200 performs semantic image segmentation to generate an image such as the synthetic image 402 and use the synthetic image 402 to generate a realistic, synthetic image 404 that looks more realistic than the synthetic image 402. As virtual images are created, the images are compiled to create the synthetic dataset. In some implementations, the synthetic dataset is generated using machine learning as described herein in connection with operation 120. For example, generating the synthetic data further includes labeling the data of the emulated sensors and the simulated playback based on a similarity of imported labeled data or other data that has been previously labeled.

In operation 850, the electronic device 1200 generates a realistic synthetic dataset using the GAN. In particular, the electronic device 1200 executes the GAN to convert a synthetic image, such as the synthetic image 402, to a more realistic looking synthetic image 404. In some implementations, the GAN compares digital twin datasets that have reasonably similar semantic or RGB channel image pairs. Examples of digital twin datasets described herein include the real image 400 and the synthetic image 402, and the real image 500 and the semantic image 502. Based on the comparison, the GAN is trained in the necessary image transfer function and converts features and manipulates perspectives in the synthetic image 402 to more closely resemble the real image, such as the real image 400. In so doing, the realistic synthetic image 404 is generated.

The use of the GAN to generate the realistic, synthetic image provides several advantages. For example, diverse data is generated by virtue of manipulating perspectives. This is because generated imagery is able to visualize data sets that are difficult to capture in real-life scenarios, which addresses AI object detection robustness issues that are traditionally present in data generation models. As another example, the GAN provides low cost training data for commercial uses because flight tests are not used or needed to generate large, relevant data sets. Instead, small data sets already created are used or only a fraction of the number of flight tests are needed. The GAN also provides a data source in a shorter amount of time than currently available. Due to programmatic data generations, full, relevant datasets can be generated in only a few days as opposed to weeks or months. Accordingly, rapid machine learning model prototyping is possible and this aids in rapid model testing for iterative model environments. Further, large data creation is made possible. Due to programmatic generation, the simulation parameters can be controlled to generate the large data sets required to build and improve AI performance.

Figure 9:
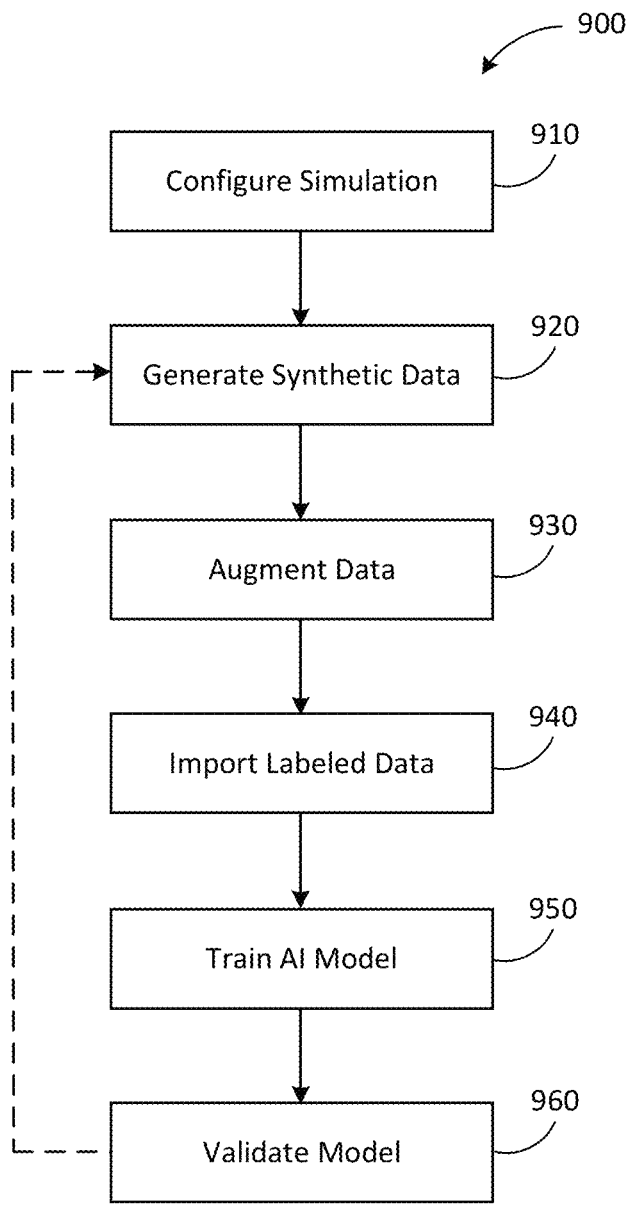
FIG. 9 illustrates a method of training and validating a model according to various implementations of the present disclosure.

FIG. 9 illustrates a method of training and validating a model according to various implementations of the present disclosure. The example of the method 900 illustrated in FIG. 9 is for illustration only. Other examples of the method 900 can be used or implemented without departing from the scope of the present disclosure. In various implementations, the method 900 can be implemented by the electronic device 1200 illustrated in FIG. 12 and described below.

In operation 910, the electronic device 1200 configures a simulation. The configured simulation includes an environment for the simulation, features in the environment such as the lighting and weather, a number of cameras to capture data, and any other necessary features of the environment. In one implementation, a configured simulation includes an airport at night, with dim lighting from a nearby hanger, three cameras onboard an aircraft in the air, in clear conditions. In operation 920, the electronic device 1200 generates synthetic data for the configured simulation. For the example configured simulation described above, the electronic device 1200 generates a synthetic airport in clear conditions at night, generates dim lighting coming from the hanger at the corresponding angle, and determines how the simulation would be viewed based on the positions of the three cameras onboard the aircraft in the air.

In operation 930, the electronic device 1200 augments, or modifies, the data. In some implementations, the electronic device 1200 decompresses semantic representations in the synthetic data and adds a semantic object into the decompressed synthetic data as described herein. By augmenting the data, the electronic device 1200 adds elements to the data to expand the sample space and improve performance of the training model. In various implementations, the electronic device 1200 augments the rendered environment. For example, the electronic device 1200 adds auxiliary objects, such as trees or additional buildings, to the data that are not the focus of the image or adds primary objects, such as obstacles, to the data that are the focus of the image. In other implementations, the electronic device 1200 augments the data by adding or updating characteristics of the data. For example, the electronic device 1200 updates the weather to include rain or snow or the electronic device 1200 updates the time of day from day to night or vice versa. The electronic device 1200 augments the data in sequential separate augmentation models so that multiple augmentations are performed without limiting the model to a single augmentation at a time. For example, in one implementation the sequential augmentation models add a semantic object, such an obstacle, add a particular weather condition, such as rain, and add a time of day, such as nighttime, to the data. In some implementations, the added object is dynamic rather than stationary.

In some implementations, the electronic device 1200 augments sensor or camera imperfections in the data. For example, in various implementations the sensor or camera collecting the data has imperfections leading to imperfections in the data, such as lens flare, dust accumulation, rain drops, snow, bug splatter, lens cracks, blurriness, sensor noise, or intrinsic imperfections in the hardware or software. These imperfections in the data are corrected by augmentation of the data as described herein. In one implementation, the imperfection is labeled or recognized by the electronic device 1200, and the electronic device corrects the imperfection by isolating the imperfect pixels, removing the imperfect pixels, and extrapolating the surrounding, correct pixels.

In operation 940, the electronic device 1200 imports labeled data. In some implementations, the labeled data is imported from previous iterations of the method 900. In other implementations, the labeled data is imported from an external source. The imported labeled data is used as a reference by the electronic device 1200 to label the augmented flight test image data. In some implementations, the imported labeled data includes information on the objects labeled in the data. For example, a labeled runway includes information that the runway is a target landing area for an aircraft and therefore, avoidance of the runway is not needed. A labeled tree includes information that the tree is an obstacle and avoidance of the tree is needed. In some implementations, the imported labeled data includes additional information such as dimensions of the object, how common the object is, additional objects similar to the object, and any variations on the object. For example, labeled data for a pine tree might include that the pine tree is on average fifty feet tall, is present in seven percent of labeled images, similar objects are fir trees and spruce trees, and variations include pine trees with and without leaves, depending on the season of year.

In operation 950, the electronic device 1200 trains an AI model using the imported labeled data. In particular, the electronic device 1200 uses the imported labeled data to teach the AI model the features in the augmented image that correspond to the imported labeled data. For example, the AI model is taught to identify an object, such as a runway, in the augmented image and correlate the runway in the augmented image to a runway in the labeled data. When the runway in the labeled data is identified, the AI model applies the imported label to the corresponding runway in the augmented image. Using this training method, the AI model identifies and labels each object in the augmented image. For a particular dataset, such as the dataset generated in the dataset generation engine 110, each augmented image is labeled and learned in this manner. In addition to labeling the augmented images, the electronic device 1200 learns the objects and images as operation 950 proceeds and stores the learned, labeled images as a learned dataset in a memory, such as the memory 1220 described in greater detail below.

In operation 960, the electronic device 1200 validates the trained AI model trained in operation 950. In some implementations, the validation is performed as a simulation to test the accuracy of the trained AI model. For example, the electronic device 1200 creates, or generates, a scenario or environment. The environment can be a known environment, such as an airport, or a computer or human generated simulated environment. The generated environment includes realistic looking features including shadows, lighting, weather conditions, time of day, and one or more objects to be detected. Then, the electronic device 1200 executes the model to determine the ability of the model to recognize and properly identify the one or more objects to be detected. The electronic device 1200 determines an accuracy of the identification of the one or more objects. In some implementations, the model is executed in more than one generated environment to increase the accuracy of the model.

In one implementation as described above, the generated environment is an airport. The airport environment includes a runway with trees on the left side and a body of water on the right. The airport environment further includes a stationary aircraft on the right side of the runway and a dynamic vehicle, such a truck, moving across the runway from the trees toward the stationary aircraft. The model is executed to measure the ability of the model to identify the runway, the trees, the body of water, the aircraft, that the aircraft is stationary, the vehicle, and that the vehicle is dynamic. Based on the identifications, the electronic device 1200 measures the ability of the model to determine that the runway is the target landing area while the trees, body of water, aircraft, and vehicle are to be avoided.

By validating the trained AI model, the electronic device 1200 identifies weaknesses in the data representation. Using the example above, based on the model identifying the runway, the trees, the body of water, the aircraft, that the aircraft is stationary, the vehicle, and that the vehicle is dynamic, but not identifying that the aircraft is an object to be avoided, the electronic device 1200 determines the data needs to be updated further. Accordingly, in operation 970, the electronic device 1200 returns to operation 920 to prepare the image for additional augmentation. From there, the electronic device 1200 executes operations 920-960 until each element of the image is correctly identified.

Figure 10:
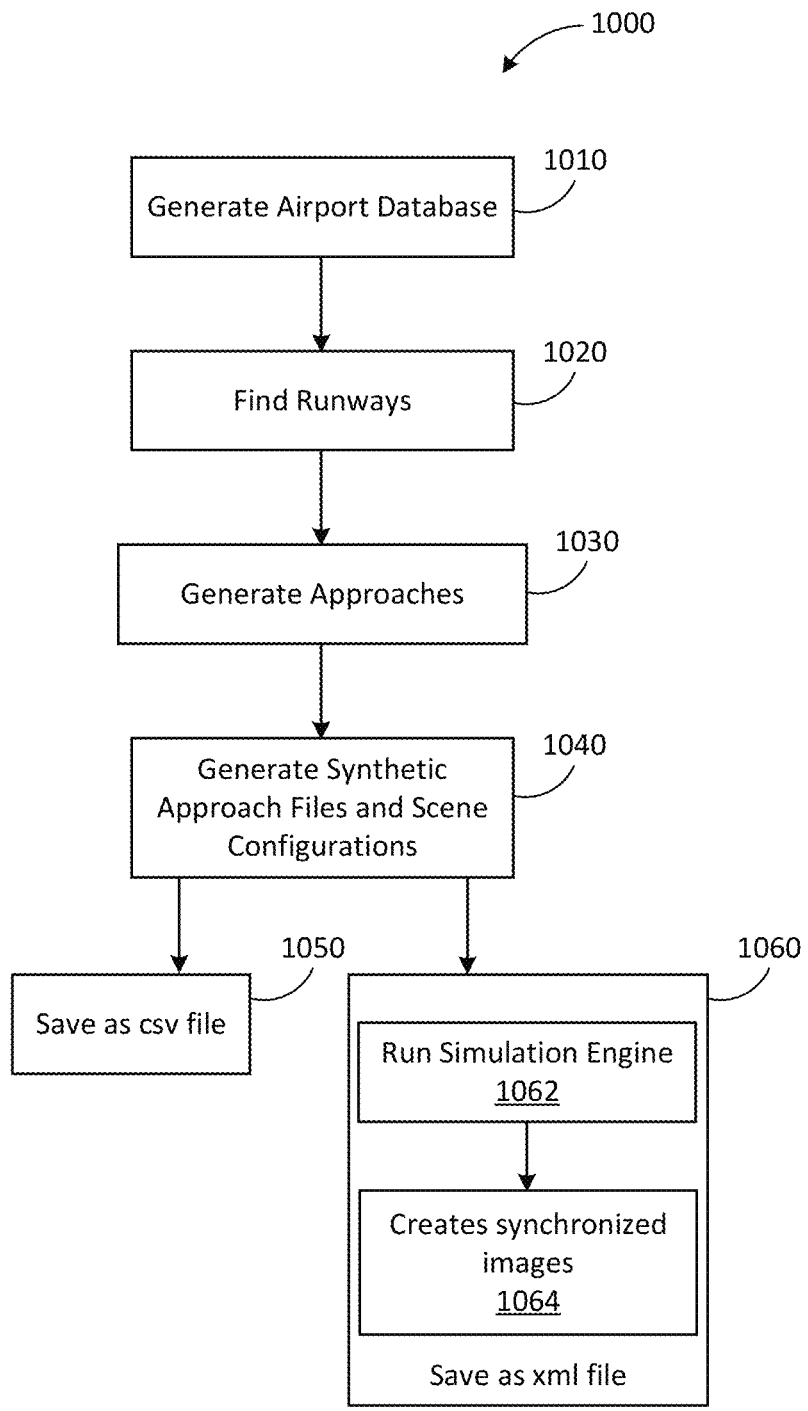
FIG. 10 illustrates a synthetic data generation software architecture according to various implementations of the present disclosure.

FIG. 10 illustrates a synthetic data generation software architecture according to various implementations of the present disclosure. In particular, FIG. 10 illustrates a synthetic data generation software architecture implemented in the simulation engine with digital twin dataset 112 according to various implementations of the present disclosure. The example of the architecture 1000 illustrated in FIG. 10 is for illustration only. Other examples of the architecture 1000 can be used or implemented without departing from the scope of the present disclosure. In various implementations, instructions for executing the architecture 1000 can be stored on the memory 1220 and executed by the processor 1205 of the electronic device 1200 illustrated in FIG. 12 and described below.

In operation 1010, the electronic device 1200 generates an airport database. In some implementations, the database is generated by the electronic device 1200. In other implementations, the database is generated externally of the electronic device 1200 and the electronic device 1200 receives, or accesses, the database. The database includes Federal Aviation Administration (FAA) airports with runway GPS coordinates for each airport. In some implementations, the database is housed in a JavaScript Object Notation (json) file.

In operation 1020, the electronic device 1200 finds the end of each runway included in the FAA airports runway database. In one implementation, a script is executed to find the termination point of each runway, identified by GPS coordinates, and create a job, or task, for each runway. In one implementation, the job for each runway is to generate approach and exit angles and positions for an aircraft approaching and leaving the runway, respectively.

In operation 1030, the electronic device 1200 generates an approach for each runway. In one implementation, an approach for an aircraft at each runway in the FAA airports database is generated. In operation 1040, the electronic device 1200 generates a synthetic approach track file, based on the generated approach, for each runway in the FAA airports database. The electronic device 1200 further generates a scene configuration for the simulation engine with digital twin datasets 112 for selected airports within the FAA airports database.

The files generated in operation 1040 are saved separately. In operation 1050, a comma separated values (.csv) file is saved that includes the synthetic approach track file. In operation 1060, an extensible markup language (.xml) file is saved that includes the scene configuration. As described herein, the scene configurations are used in the simulation engine with digital twin datasets 112. The simulation engine 112 is executed, as described herein in connection with FIG. 1, in operation 1062 to create synchronized images in operation 1064.

Figure 11:
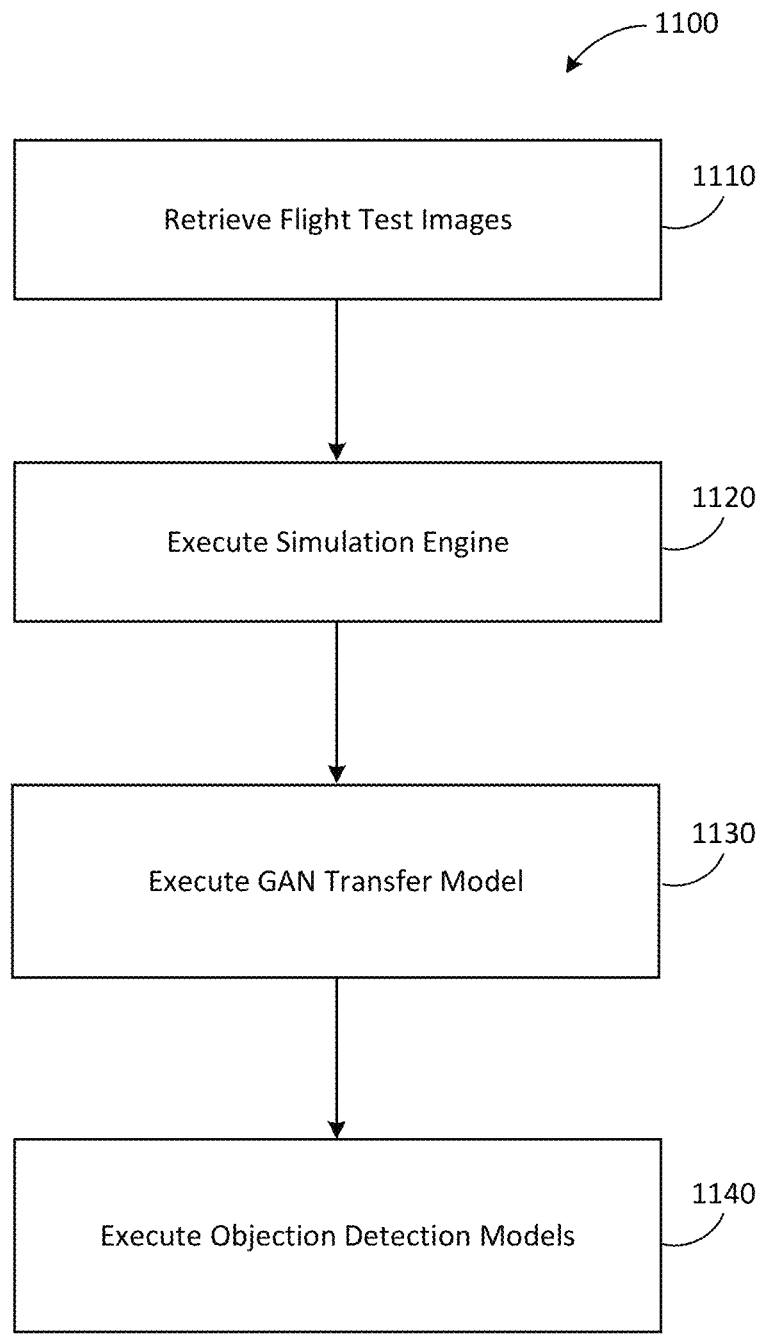
FIG. 11 illustrates an example systems architecture according to various implementations of the present disclosure.

FIG. 11 illustrates an example systems architecture according to various implementations of the present disclosure. The systems architecture 1100 illustrated in FIG. 11 is for illustration only. Other examples of the architecture 1100 can be used or implemented without departing from the scope of the present disclosure. In various implementations, instructions for executing the architecture 1100 can be stored on the memory 1220 and executed by the processor 1205 of the electronic device 1200 illustrated in FIG. 12 and described below.

In operation 1110, the electronic device 1200 retrieves flight test images. In some implementations, the flight test images are real images previously captured by an in-flight camera onboard an aircraft during a flight operation of a plurality of known environments. In other words, at least one image is captured of each of a plurality of environments. The flight test images are stored in a database for retrieval. In another implementation, the flight test images are captured in real time either by the electronic device 1200 or are transmitted to the electronic device 1200.

In operation 1120, the electronic device 1200 executes a simulation engine to generate a synthetic version of the real flight test images retrieved in operation 1110. The execution of the simulation includes playing back the flight test images in a simulated flight and emulating sensors on the aircraft of the playback simulation. In some implementations, the execution of the simulation engine includes operations 620 through 640 of the method 112, described in the description of FIG. 6 above. In particular, during the playback of the images, the electronic device 1200 reviews the images of the environment, such as the airport, captured by the in-flight camera and emulates sensors onboard the aircraft to determine the data the GPS/IMU sensors would capture if the simulated playback were being performed in real time. Based on the simulation playback and data from the emulated sensors, the electronic device 1200 generates a synthetic image, such as the semantic image 502. After the simulation playback, the electronic device 1200 augments the synthetic image. In various implementations, the electronic device 1200 performs one or more of weather environment generation, airport environment generation, semantic segmentation generation, foreign object augmentation, and light and visibility augmentation. The augmentation of the synthetic data enhances the features of the synthetic image, such as the weather, airport features, additional objects, and lighting elements.

In operation 1130, the electronic device 1200 trains and executes the GAN based style transfer model for unpaired image to image translation to generate a realistic synthetic training dataset. The GAN, through machine learning, is trained to recognize the first real object in the known environment by associating one of the RGB images of the one of the plurality of known environments in the received (or accessed or collected) dataset to a pre-stored synthetic image that corresponds to the RGB image in the dataset. In some implementations, one of the RGB images of the one of the plurality of known environments in the received (or accessed or collected) dataset is associated with a pre-stored synthetic image that corresponds to the RGB image in the dataset in real-time. The GAN compares the synthetic image to the real image and, by correlating features in the associated real and synthetic images, learns the particular features of the real image, including the first real object to generate a more realistic version of the synthetic image, such as the virtual image 504. In some implementations, operations 1120 and 1130 are repeated for each flight test image retrieved in operation 1110 in order to generate a realistic synthetic training dataset including multiple realistic, synthetic images. Through the process of generating the realistic synthetic training dataset, the electronic device 1200 learns the features of objects in each image for more accurate detection during a flight.

In operation 1140, object detection models are executed. In one implementation, such as where the electronic device 1200 is an aircraft or onboard an aircraft, the electronic device 1200 executes the object detection model. In another implementation, where the electronic device 1200 is not an aircraft or onboard an aircraft, the aircraft receives the realistic synthetic training dataset from the electronic device 1200 and executes the object detection model. The object detection model includes capturing image data, using an onboard camera, such as the camera 1240, to capture image data during a flight. The captured image data is compared to the realistic synthetic training dataset to detect and identify objects similar to the objects included in the realistic synthetic training dataset. By comparing the captured image data to the realistic synthetic training dataset rather than the synthetic images generated by the simulation engine in operation 1120, the object detection model is more robust and enables faster, more accurate object detection in real-time during a flight.

In one implementation, the object detection model predicts thermal images from a single frame or series of frames in a temporal format of RGB images and vice versa. By implementing the GAN, the object detection models are optimized based on different weather and environmental conditions, such as snowy, rainy, or sunny conditions.

Figure 12:
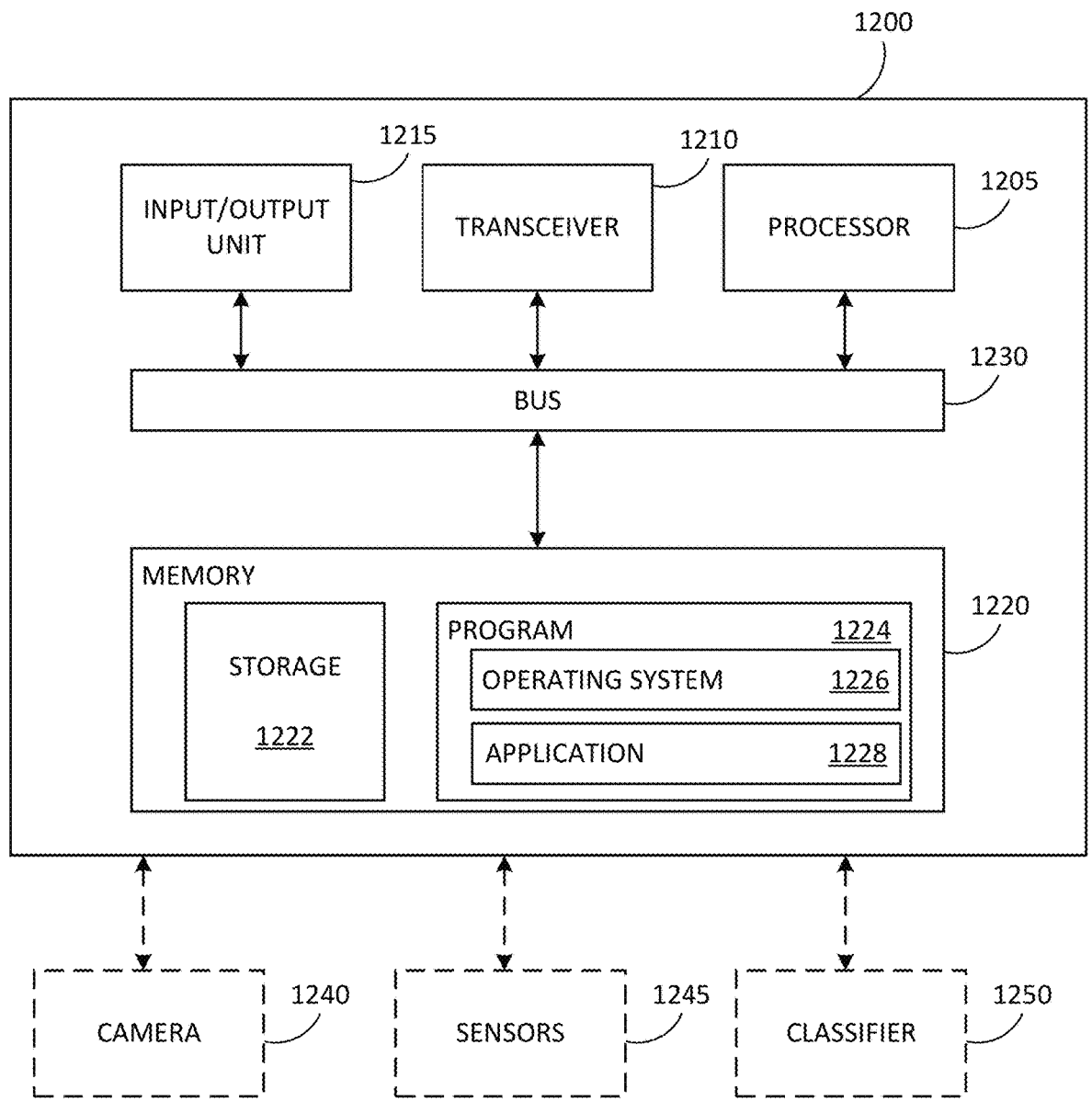
FIG. 12 illustrates an electronic device according to various implementations of the present disclosure.

FIG. 12 illustrates an electronic device according to various implementations of the present disclosure. The example of the electronic device 1200 illustrated in FIG. 12 is for illustration only. Other examples of the electronic device 1200 can be used without departing from the scope of the present disclosure.

The electronic device 1200 includes a processor 1205, a transceiver 1210, an input/output (I/O) unit 1215, and a memory, or medium, 1220. The processor 1205, the transceiver 1210, the I/O unit 1215, and the memory 1220 are connected to one another by a bus 1230 to send messages between each of the components of the electronic device 1200. The memory 1220 further includes a storage 1222 to store data and various programs 1224. The programs 1224 include an operating system 1226 and one or more applications 1228 that are executed by the processor 1205.

The processor 1205 is configured to execute the operating system 1226 and the one or more applications 1228 stored in the memory 1220. The applications 1228 include particular program code executed by the processor 1205 that performs one or more of the functions described in greater detail below.

The transceiver 1210 is configured to send and receive signals to and from, respectively, the electronic device 1200. For example, the transceiver 1210 sends and receives signals to an external device, such as a user equipment (UE), a server, or any other suitable electronic device.

The I/O unit 1215 is configured to allow the electronic device 1200 to directly connect to another device. For example, the I/O unit 1215 includes one or more ports configured to allow connections to and from the electronic device 1200.

The electronic device 1200 optionally includes or be connected to a camera 1240. The camera 1240 is configured to capture image or video data. The captured image or video data is stored in the storage 1222 of the memory 1220 and analyzed by the processor 1205. The electronic device 1200 optionally includes or be connected to one or more sensors 1245. The sensors can include one or both of global positioning system (GPS) sensors and inertial measurement unit (IMU) sensors. The processor 1205 receives data from the sensor(s) 1245 in the GAN to the realistic synthetic training dataset as described herein.

The electronic device 1200 optionally includes a classifier 1250 to classify a synthetic image. In one implementation, the classifier further measures a realism gap between the synthetic image and a corresponding real image, for example, by measuring a variance in illumination, hue, and/or saturation values in the image. However, other measurements can be performed on other parameters, features, characteristics, etc. A metric of the realism gap is output to the processor 1205, which determines the accuracy of the synthetic image as it relates to the real image by determining whether the accuracy is above the threshold as described herein.

Although described in connection with the electronic device 1200, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

In one implementation, the electronic device 1200 is an aircraft. In these implementations, the electronic device 1200 further includes additional mechanical and electrical features to function as an aircraft, including wings, takeoff and landing gear, a cockpit, and instrumental controls. In another implementation, the electronic device 1200 is housed on an aircraft. In another implementation, the electronic device 1200 is external to an aircraft and is configurable to communicate with the aircraft via the transceiver 1210 to perform the functions described herein. Although described herein as an aircraft or communicable with an aircraft, these implementations are for illustration only and should not be construed as limiting. The electronic device 1200 can be, or be implemented in, any autonomous vehicle, a mobile electronic device, laptop computer, tablet, server, or any other type of electronic device suitable for performing the functions described herein.

As indicated above, program code instructions may be stored in memory, and executed by processing circuitry that is thereby programmed, to implement functions of the systems, subsystems, tools, and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded, and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. It will also be understood that one or more functions, and combinations of functions, may be implemented by special purpose hardware-based computer systems and/or processing circuitry s which perform the specified functions, or combinations of special purpose hardware and program code instructions.

The following clauses describe further aspects of the present disclosure. In some implementations, the clauses described below can be further combined in any sub-combination without departing from the scope of the present disclosure.

Clause Set A:

A1: An apparatus for identifying objects, the apparatus comprising:
 a processor configured to execute instructions stored on a memory; and
 the memory storing computer-readable instructions that, when executed by the processor, cause the processor to:
 receive a dataset comprising an image having first real image features,
 train a neural network to recognize the first real image features in the received dataset, and
 perform a synthetic image augmentation to generate synthetic image features corresponding to the first real image features in the received dataset using the neural network, such that the synthetic image augmentation allows for training of a computer vision function for recognizing second real image features, corresponding to the synthetic image features, in a real-world environment.

A2: The apparatus of clause A1, wherein the image is one of a plurality of known environments in the received dataset, and the image is associated with a pre-stored synthetic image corresponding to the image.

A3: The apparatus of clause A2, wherein the processor is further configured to measure a realism gap between the image and a synthetic image corresponding to the image, the realism gap measured by receiving a performance metric of the corresponding computer vision function as applied to a known environment of the plurality of known environments and comparing the performance metric of the corresponding synthetic image of the known environment to a threshold, and wherein the realism gap is a measure of a realism difference between a real image of the known environment and a corresponding synthetic image of the known environment.

A4: The apparatus of clause A3, wherein the processor is further configured to:

determine an insufficient data representation in the synthetic image augmentation, update the synthetic image augmentation to include additional representation of features corresponding to the insufficient data representation, and receive an updated performance metric of the computer vision function for the corresponding synthetic image based on the updated synthetic image augmentation.

A5: The apparatus of clause A1, wherein the processor is further configured to:

generate a virtual airport environment corresponding to a computationally derived position of a vehicle or recorded position from the vehicle, wherein the vehicle includes a vehicle camera; and generate a corresponding synthetic image based on the position of the vehicle.

A6: The apparatus of clause A5, wherein the computer vision function for recognizing the second real image features in the real-world environment corresponds to the synthetic image in the virtual airport environment.

A7: The apparatus of clause A1, wherein the processor is further configured to associate, in real-time, the image to a synthetic image corresponding to the image.

A8: The apparatus of clause A1, wherein the processor is further configured to import pre-labeled data to label the synthetic image features corresponding to the real image features in the generated synthetic image augmentation.

Clause Set B:

B1: A method for identifying objects, the method comprising:

receiving a dataset comprising an image having first real image features, training a neural network to recognize the first real image features in the received dataset, and performing a synthetic image augmentation to generate synthetic image features corresponding to the first real image features in the received dataset using the neural network, such that the synthetic image augmentation allows for improved training of a computer vision function for recognizing second real image features, corresponding to the synthetic image features, in a real-world environment that is previously unknown prior to the recognizing of the second real image features.

B2: The method of clause B1, wherein:

the image is one a plurality of known environments in the received dataset, and the image is associated with a pre-stored synthetic image corresponding to the image.

B3: The method of clause B2, further comprising measuring a realism gap between the image and a synthetic image corresponding to the previously captured image by receiving a performance metric of the corresponding computer vision function as applied to a known environment of the plurality of known environments and comparing the performance metric of the corresponding synthetic image of the known environment to a threshold, wherein the realism gap is a measure of a realism difference between a real image of the known environment and a corresponding synthetic image of the known environment.

B4: The method of clause B3, wherein the method further comprises:

determining an insufficient data representation in the synthetic image augmentation, updating the synthetic image augmentation to include additional representation of features corresponding to the insufficient data representation, and receiving an updated performance metric of the computer vision function for the corresponding synthetic image based on the updated synthetic image augmentation.

B5: The method of clause B1, further comprising:

generating a virtual airport environment corresponding to a computationally derived position of a vehicle or recorded position from the vehicle, wherein the vehicle includes a vehicle camera; and generating a corresponding synthetic image based on the position of the vehicle, B6: The method of clause B5, further comprising:

wherein the computer vision function for recognizing the second real image features in the real-world environment corresponds to the synthetic image in the virtual airport environment.

B7: The method of clause B5, further comprising associating, in real-time, the image of one of a plurality of known environments in the received dataset to a synthetic image corresponding to the previously captured image.

B8: The method of clause B5, further comprising importing pre-labeled data to label the synthetic image features corresponding to the real image features in the generated synthetic image augmentation.

Clause Set C:

C1: A computer program product, comprising a computer usable medium having a computer readable program code embodied therein, the computer readable program code adapted to be executed, to identify objects, to:

receive a dataset comprising an image having first real image features, train a neural network to recognize the first real image features in the received dataset, and perform a synthetic image augmentation to generate synthetic image features corresponding to the first real image features in the received dataset using the neural network, such that the synthetic image augmentation allows for improved training of a computer vision function for recognizing second real image features, corresponding to the synthetic image features, in a real-world environment.

C2: The computer program product of clause C1, wherein:

the image is one of a plurality of known environments in the received dataset, the image is associated with a pre-stored synthetic image corresponding to the image, and the computer readable program code is further adapted to measure a realism gap between the image and a synthetic image corresponding to the image, the realism gap measured by receiving a performance metric of the corresponding computer vision function as applied to the known environment and comparing the performance metric of the corresponding synthetic image of the known environment to a threshold,
wherein the realism gap is a measure of a realism difference between a real image of the known environment and a corresponding synthetic image of the known environment.

C3: The computer program product of clause C1, wherein the computer readable program code is further adapted to:
generate a virtual airport environment corresponding to a computationally derived position of a vehicle or recorded position from the vehicle, wherein the vehicle includes a vehicle camera; and
generate a corresponding synthetic image based on the position of the vehicle, C4: The computer program product of clause C1, wherein the computer readable program code is further adapted to associate, in real-time, the image to a synthetic image corresponding to the image.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one implementation or may relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. As an illustration, the above-described implementations (and/or aspects thereof) are usable in combination with each other. In addition, many modifications are practicable to adapt a particular situation or material to the teachings of the various implementations of the disclosure without departing from their scope. While the dimensions and types of materials described herein are intended to define the parameters of the various implementations of the disclosure, the implementations are by no means limiting and are exemplary implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and includes other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An apparatus for identifying objects, the apparatus comprising:
a processor configured to execute instructions stored on a memory; and
the memory storing computer-readable instructions that, when executed by the processor, cause the processor to:
receive a dataset comprising an image having first real image features;
train a neural network to recognize the first real image features in the dataset;

perform a synthetic image augmentation to generate synthetic image features corresponding to the first real image features in the image using the neural network,
 wherein the synthetic image augmentation allows for training of a computer vision function for recognizing second real image features, corresponding to the synthetic image features, in a real-world environment;
associate, in real-time, the image to a synthetic image corresponding to the image by correlating features in the image with the synthetic image features,
 wherein the synthetic image features are of the synthetic image;
measure a realism gap between the image and the synthetic image corresponding to the image,
wherein to measure the realism gap, the instructions further cause the processor to:
 classify each of the synthetic image features of the synthetic image to obtain a synthetic classification, and
 compare the synthetic classification to a classification of the image,
  wherein the classification of the image relates to classification of each of the first real image features;
determine that the realism gap does not satisfy a threshold; and
update the synthetic image augmentation with data that includes one or more additional semantic objects based on the realism gap not satisfying the threshold.

2. The apparatus of claim 1, wherein the processor is further configured to:
generate a virtual airport environment corresponding to a computationally derived position of a vehicle or recorded position from the vehicle, wherein the vehicle includes a vehicle camera; and
generate a corresponding synthetic image based on the computationally derived position of the vehicle.

3. The apparatus of claim 2, wherein the computer vision function for recognizing the second real image features in the real-world environment corresponds to the synthetic image in the virtual airport environment.

4. The apparatus of claim 1, wherein the processor is further configured to import pre-labeled data to label an association of the synthetic image features corresponding to the first real image features in the synthetic image augmentation.

5. The apparatus of claim 1, wherein comparing the synthetic classification to the classification of the image comprises determining a number of the synthetic image features that are incorrectly classified.

6. The apparatus of claim 5, wherein the image is one of a plurality of known environments in the dataset, wherein the first real image features include one or more objects in the plurality of known environments, and wherein determining the number of the synthetic image features that are incorrectly classified comprises determining a number of objects in the synthetic image that are incorrectly classified.

7. The apparatus of claim 1, wherein responsive to a determination that the realism gap does not satisfy the threshold, the processor is configured to:
generate a second synthetic image corresponding to the image;
measure a second realism gap between the image and the second synthetic image corresponding to the image; and
determine whether the second realism gap satisfies the threshold.

8. The apparatus of claim 1, wherein the one or more additional semantic objects are primary objects which are added to the data that includes the one or more additional semantic objects that are a focus of the image.

9. A method for identifying objects comprising
receiving, by a device, a dataset comprising an image having first real image features;
training, by the device, a neural network to recognize the first real image features in the image;
performing, by the device, a synthetic image augmentation to generate synthetic image features corresponding to the first real image features in the image using the neural network,
 wherein the synthetic image augmentation allows for training of a computer vision function for recognizing second real image features, corresponding to the synthetic image features, in a real-world environment;
associating, in real-time and by the device, the image to a synthetic image corresponding to the image by correlating features in the image with the synthetic image features,
wherein the synthetic image features are of the synthetic image;
measuring, by the device, a realism gap between the image and the synthetic image corresponding to the image,
 wherein measuring the realism gap comprises:
  classifying each of the synthetic image features of the synthetic image to obtain a synthetic classification, and
  comparing the synthetic classification to a classification of the image, wherein the classification of the image relates to classification of each of the first real image features;
determining that the realism gap does not satisfy a threshold; and
updating the synthetic image augmentation with data that includes one or more additional semantic objects based on the realism gap not satisfying the threshold.

10. The method of claim 9, further comprising:
generating a virtual airport environment corresponding to a computationally derived position of a vehicle or recorded position from the vehicle, wherein the vehicle includes a vehicle camera; and
generating a corresponding synthetic image based on the recorded position of the vehicle.

11. The method of claim 10, wherein the computer vision function for recognizing the second real image features in the real-world environment corresponds to the synthetic image in the virtual airport environment.

12. The method of claim 10, further comprising associating, in real-time, the image of one of a plurality of known environments in the dataset to the synthetic image corresponding to the image.

13. The method of claim 9, further comprising importing prelabeled data to label the synthetic image features corresponding to the real image features in the synthetic image augmentation.

14. The method of claim 9, wherein comparing the synthetic classification to the classification of the image comprises:
determining a number of the synthetic image features that are incorrectly classified.

15. The method of claim 14, wherein the image is one of a plurality of known environments in the dataset, wherein the first real image features include one or more objects in the plurality of known environments, and wherein determining the number of the synthetic image features that are incorrectly classified comprises determining a number of objects in the synthetic image that are incorrectly classified.

16. The method of claim 9, wherein responsive to a determination that the realism gap does not satisfy the threshold, the method further comprises:
generating a second synthetic image corresponding to the image;
measuring a second realism gap between the image and the second synthetic image corresponding to the image; and
determining whether the second realism gap satisfies the threshold.

17. A non-transitory computer-readable medium storing a set of instructions, the instructions comprising:
one or more instructions that, when executed by one or more processors of a device, cause the device to:
receive a dataset comprising an image having first real image features;
train a neural network to recognize the first real image features in the image;
perform a synthetic image augmentation to generate synthetic image features corresponding to the first real image features in the image using the neural network, such that the synthetic image augmentation allows for improved training of a computer vision function for recognizing second real image features, corresponding to the synthetic image features, in a real-world environment,
associate, in real-time, the image to a synthetic image corresponding to the image by correlating features in the image with the synthetic image features,
wherein the synthetic image features are of the synthetic image;
measure a realism gap between the image and the synthetic image corresponding to the image,
wherein the one or more instructions, that cause the device to measure the realism gap, cause the device to:
classify each of the synthetic image features of the synthetic image to obtain a synthetic classification, and
compare the synthetic classification to a classification of the image, wherein the classification of the image relates to classification of each of the first real image features;
determine that the realism gap does not satisfy a threshold; and
update the synthetic image augmentation with data that includes one or more additional semantic objects based on the realism gap not satisfying the threshold.

18. The non-transitory computer-readable medium of claim 17, wherein the one or more instructions, when executed by the one or more processors, further cause the device to:
generate a virtual airport environment corresponding to a computationally derived position of a vehicle or recorded position from the vehicle, wherein the vehicle includes a vehicle camera; and
generate a corresponding synthetic image based on the computationally derived position of the vehicle.

19. The non-transitory computer-readable medium of claim 17, wherein the one or more instructions, that cause the device to compare the synthetic classification to the classification of the image, cause the device to:
determine a number of the synthetic image features that are incorrectly classified.

20. The non-transitory computer-readable medium of claim 17, wherein the one or more additional semantic objects are primary objects which are added to the data that includes the one or more additional semantic objects that are a focus of the image.

* * * * *